United States Patent
Khalid

(10) Patent No.: US 12,407,165 B2
(45) Date of Patent: Sep. 2, 2025

(54) FAULT RECOVERY CONTROLLER FOR INTEGRATED SOLAR PV SYSTEM

(71) Applicant: KING FAHD UNIVERSITY OF PETROLEUM AND MINERALS, Dhahran (SA)

(72) Inventor: Muhammad Khalid, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 2 days.

(21) Appl. No.: 18/394,452

(22) Filed: Dec. 22, 2023

(65) Prior Publication Data

US 2025/0096566 A1   Mar. 20, 2025

Related U.S. Application Data

(60) Provisional application No. 63/583,075, filed on Sep. 15, 2023.

(51) Int. Cl.
*H02J 3/18* (2006.01)
*H02M 7/537* (2006.01)

(52) U.S. Cl.
CPC .......... *H02J 3/1878* (2013.01); *H02M 7/537* (2013.01)

(58) Field of Classification Search
CPC .......... H02J 3/18; H02J 3/1878; H02M 7/537
USPC ......................................................... 307/31
See application file for complete search history.

(56) References Cited

U.S. PATENT DOCUMENTS

2018/0115255 A1   4/2018   Jalili
2020/0064782 A1   2/2020   Li et al.

FOREIGN PATENT DOCUMENTS

CN    109713711 B    7/2022

OTHER PUBLICATIONS

Molina-Garcia et al.: "Reactive Power flow Control for PV Inverters Voltage Support in LV Distribution Networks"; IEEE Transactions on Smart Grid, vol. 8, No. 1; Jan. 2017; pp. 447-456. (Year: 2017).*

(Continued)

*Primary Examiner* — Hal Kaplan
(74) *Attorney, Agent, or Firm* — Oblon, McClelland, Maier & Neustadt, L.L.P.

(57) ABSTRACT

A reactive power support system for a radial distribution network includes multiple loads, a radial distribution transmission line (RDTL) connected at a first end to a grid transformer, a point of common coupling (PCC) connected to a second end of the RDTL, a solar power inverter connected in parallel with a photovoltaic module and an inverter controller connected to the inverter. An output terminal of the inverter is connected to the PCC. Each load is connected by a load bus to the RDTL. The inverter controller provides gate control signals which switch a set of transistor gates of the inverter to operate at less than or greater than a unity power factor to inject or to absorb the reactive power, respectively, at the PCC in order to regulate a voltage of the RDTL during a three-phase to ground fault on a load bus connected to one of the loads.

20 Claims, 11 Drawing Sheets

(56) References Cited

OTHER PUBLICATIONS

El Moursi et al. ; Fault ride through capability for grid interfacing large scale PV power plants ; IET Generation, Transmission & Distribution, vol. 7, Iss. 9 ; Apr. 23, 2013 ; 11 Pages.
Molina-Garcia et al. ; Reactive Power Flow Control for PV Inverters Voltage Support in LV Distribution Networks ; IEEE Transactions on Smart Grid, vol. 8, Issue 1 ; Nov. 4, 2016 ; Abstract Only ; 1 Page.

* cited by examiner

FAULT RECOVERY CONTROLLER FOR INTEGRATED SOLAR PV SYSTEM

CROSS REFERENCE TO RELATED APPLICATIONS

The present application claims the benefit of priority to U.S. Prov. App. No. 63/583,075, titled "Fault Recovery Controller for Integrated Solar PV System", filed on Sep. 15, 2023.

STATEMENT REGARDING PRIOR DISCLOSURE BY THE INVENTORS

Aspects of this technology are described in an article "Voltage Recovery Through Active-Reactive Coordination of Solar PV Inverters During Grid Fault", published by 2022 11th International Conference on Renewable Energy Research and Application (ICRERA), Istanbul, Turkey, 2022, pp. 395-399, doi: 10.1109/ICRERA55966.2022.9922796, on Oct. 25, 2022, incorporated herein by reference in its entirety.

STATEMENT OF ACKNOWLEDGEMENT

The inventor(s) acknowledge the financial support provided by the King Fahd University of Petroleum and Minerals (KFUPM), Riyadh, Saudi Arabia through Project #INRE2106.

BACKGROUND

Technical Field

The present disclosure is directed to a method for controlling a photovoltaic inverter for the ride-through of a network fault, and more particularly relates to a fault recovery controller for an integrated solar PV system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Establishment of a green and sustainable energy sector highlights the growing acceptance of renewable energy sources. Accommodating variable renewable energy sources becomes increasingly challenging at higher penetration levels. Currently, more reliable energy management strategies and standards need to be formulated to mitigate the impact of variable renewable energy sources (RES) and introduce a more effective form of power system flexibility.

The integration of renewable energy sources, such as solar, wind, or similar sources, with a power grid can be accomplished through various means. Renewable energy sources often include an inverter to convert the DC signal from the renewable source into an AC signal to support the grid in accordance with electricity demand. However, during faults, such as a grid fault, LLL fault, LLLG fault, etc., the assignment of a fixed power factor of the inverter for the integrated renewable energy sources with the grid can help mitigate the aforementioned fault.

Following recommendations by the IEEE-1547 standard regarding the restriction of voltage regulation by distributed generators, most inverters are permitted to operate at a fixed unity power factor with negligible reactive power injection or absorption in both small and large renewable distributed generator interconnections. However, due to renewable intermittency, this active power injection initiates an undesirable trend of steady-state voltage variations during ramped renewable distributed output or light loading periods.

Some utilities have achieved voltage regulation by stipulating a fixed predetermined reactive power compensation capability of inverters. This is accomplished through either "fixed Q" (where Q refers to a reactive power factor) and/or "fixed cos $\varphi$" (where cos $\varphi$ refers to an angle between the real and apparent power) methods. Although these methodologies do not actively alleviate voltage variations, with thorough study before interconnection, they can, to some extent, establish reactive power flow between the grid and distributed generators (DGs), thereby mitigating voltage fluctuations or any one of faults including L (single line-to-ground fault), LL (double line-to-ground fault), LLL (triple line-to-ground fault), L-G (line-to-ground fault), LL-G (double line-to-ground fault) or LLL-G (triple line-to-ground fault) faults arising from intermittent distributed generator active power output.

Quantifying the reactive power capability of the inverter in a PV system has been proposed. For instance, US20200064782A1 describes a centralized control technique for multiple inverters that were evaluated on a distributed grid system, in contrast to a radial distribution grid where voltage vulnerability and sensitivity are higher. However, US20200064782A1 employs Artificial Neural Network (ANN) techniques to determine the D and Q outputs of the inverter, which are then used to compute the necessary reactive power for grid stabilization. Using an ANN to compute the D and Q outputs increases the computational cost and complexity.

CN109713711B describes a reactive coordination control strategy for distributed photovoltaic inverters under faults, employing equal reactive power injection from all inverters. However, the document relies on centralized coordination and is designed for coordinated active/reactive power control of distributed inverters. The centralized coordination approach raises the computation cost of the system. Additionally, the method involves a complex procedure to control the inverter controller for reactive power computation.

US20180115255A1 outlines a method for controlling an inverter connected between a photovoltaic generator and a power supply network to facilitate the ride-through of a network fault, focusing on controlling the DC link voltage. However, the methodology does not include generating reactive power from the inverter for grid stability.

A control method can be used to enhance fault ride-through capability for utility-scale photovoltaic power plants. (See: Mohamed Shawky El Moursi, Weidong Xiao, Jim. L. Kirtley Jr, "*Fault ride-through capability for grid interfacing large scale PV power plants*," WILEY, doi: https://doi.org/10.1049/iet-gtd.2013.0154). Disabling maximum power point tracking (MPPT) operation and halting active power injection when the grid voltage, vg, falls below 0.7 p.u. are included. However, ceasing active power injection may result in undesired curtailment of the active power generated by the PV system.

A reactive power flow control aiming to actively integrate photovoltaic systems into LV distribution networks was proposed (See: Ángel Molina-García, Rosa A. Mastromauro, Tania García-Sanchez, Sante Pugliese, Marco Liserre, Silvio Stasi, "Reactive Power Flow Control for PV Inverters Voltage Support in LV Distribution Networks", IEEE Access, Volume: 8, Issue: 1, Pages 447-456, doi: 10.1109/TSG.2016.2625314). The controller establishes P-w and Q-V parameters using predefined reactive power capability curves for 6 kW inverters. However, injecting reactive power at a bus or grid fault is not described.

Each of the previously mentioned methods or systems has one or more limitations that hinder their widespread adoption. Consequently, there is a need for systems and methods capable of providing reactive power to the grid from a grid-connected PV inverter during LLL or LLLG faults.

SUMMARY

In an exemplary embodiment, a reactive power support system for a radial distribution network is described. The reactive power support system for a radial distribution network comprises a radial distribution transmission line connected at a first end to a grid transformer and a plurality of loads. Each load is connected by a load bus to the radial distribution transmission line. The reactive power support system further comprises a point of common coupling connected to a second end of the radial distribution transmission line, a photovoltaic module and a solar power inverter connected in parallel with the photovoltaic module. The solar power inverter has an output terminal configured to connect to the point of common coupling. The reactive power support system further comprises an inverter controller connected to the solar power inverter. The inverter controller is configured to provide gate control signals which switch a set of transistor gates of the solar power inverter to operate at less than or greater than a unity power factor to provide reactive power or to absorb reactive power respectively at the point of common coupling in order to regulate a voltage of the radial distribution transmission line during a three-phase to ground fault on a load bus connected to one of the loads.

In another exemplary embodiment, a method of providing reactive power support to a radial distribution network is described. The method includes connecting a first end radial distribution transmission line to a grid transformer. The method further includes connecting a plurality of loads in parallel to the radial distribution transmission line. The method further includes installing a photovoltaic module. The method further includes connecting a solar power inverter in parallel with the photovoltaic module. The method further includes connecting an output terminal of the solar power inverter to a point of common coupling at a second end of the radial distribution transmission line. The method further includes connecting an inverter controller to the solar power inverter. The method further includes measuring, with a voltmeter, a voltage at the point of common coupling. The method further includes receiving, by the inverter controller, the voltage measured at the point of common coupling and a voltage reference value. The method further includes generating, by the inverter controller, gate control signals configured to switch a set of transistor gates of the solar power inverter to operate at less than or greater than a unity power factor to provide reactive power to or to absorb reactive power at the point of common coupling respectively when the voltage measured at the point of common coupling is less than or greater than the voltage reference value due to a three-phase to ground fault on a load bus connected to one of the loads.

In another exemplary embodiment, a method of providing reactive power support by a photovoltaic module to a grid connected radial distribution network connected to a plurality of load buses is described. The method includes installing a photovoltaic module and connecting a solar power inverter in parallel with the photovoltaic module. The method further includes connecting an output terminal of the solar power inverter to a point of common coupling of the radial distribution transmission line and connecting an inverter controller to the solar power inverter. The method further includes measuring, with a voltmeter, a voltage at the point of common coupling. The method further includes receiving, by the inverter controller, the voltage measured at the point of common coupling and a voltage reference value. The method further includes generating, by the inverter controller, gate control signals configured to switch a set of transistor gates of the solar power inverter to operate at less than or greater than a unity power factor to provide reactive power to or to absorb reactive power at the point of common coupling respectively when the voltage measured at the point of common coupling is less than or greater than the voltage reference value due to a three-phase to ground fault on a load bus connected to one of the loads.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
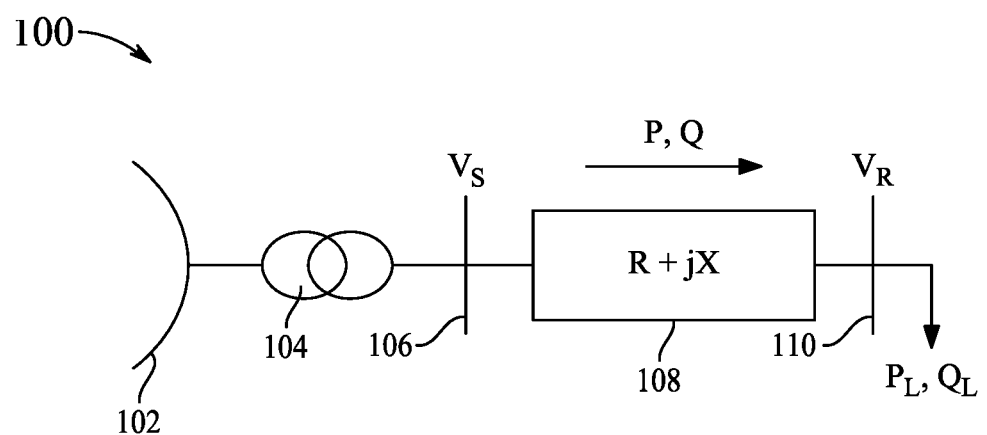
FIG. 1 illustrates a simple two-bus distribution network.

In the drawings, like reference numerals designate identical or corresponding parts throughout the several views.

Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a reactive power support system for a radial distribution network, a method of providing reactive power support to a radial distribution network and a method of providing reactive power support by a photovoltaic module to a grid connected radial distribution network connected to a plurality of load buses. The reactive power support system is configured to provide the reactive power by operating a voltage inverter connected to a PV panel at a non-unitary power factor to generate the reactive power to compensate for one or more grid faults. The reactive power support system is configured with a control curve that establishes the relation between the active-reactive power with the bus voltage in the radial distribution network.

FIG. 1 illustrates a conventional simplified two-bus distribution network 100. The simplified two-bus distribution network 100 may be a radial distribution network, such as, but not limited to, a ring-type radial distribution network, an interconnected type of radial distribution network, or various other types of radial distribution networks. The two-bus distribution network 100 includes an electrical distribution station 102. The electrical distribution station 102 may refer to, but is not limited to an electrical substation, distribution substations, a radial distribution system or the like. The two-bus distribution network 100 includes an on-load tap changer 104 along with a transformer (indicated by the double circle symbol). The on-load tap changer 104 regulates the output voltage of the transformer (not shown). The regulation is performed by altering the turn ratios of the transformer (not shown) by changing the number of turns in one winding. The regulation ensures the quality of the voltage by increasing the grid voltage through the electrical distribution station 102 when power consumption is high and reducing it when power consumption is low. The on-load tap changer 104 may be a reactance type, resistive type or the like. The two-bus distribution network 100 further includes buses 106 and 110 electrically coupled with the on-load tap changer 104, and a transmission line 108 with electrical impedance R+jX between the buses 106 and 110. PL and QL represent a real and reactive power, respectively, of a load (not shown) coupled with the bus 110. The active and reactive power is represented by P and Q, respectively. The sending end voltage is represented as $\widehat{V}_s$, and $\hat{V}_R$ denotes the receiving end voltage in the two-bus distribution network 100.

Active voltage regulation can be established as a function of a local variable for the two-bus distribution network 100. The relationship between system variables and parameters can be established. For instance, the power factor of a distributed generator (not shown), such as solar PV or wind system integrated into the two-bus distribution network 100, may be actively adjusted as a function of the locally measured active power injected into the grid (not shown) by the distributed generator (not shown). This adjustment limits the impact of active power variation and simultaneous mitigation of the voltage regulation through reactive power compensation is achieved. Mathematically, the expression is shown as below:

$$\hat{V}_s = \hat{V}_s + \frac{RP + XQ}{\hat{V}_s^*} + j\frac{XP + RQ}{\hat{V}_s^*}, \quad (1)$$

$$\Delta \hat{V} = \hat{V}_s = \hat{V}_s + \frac{RP + XQ}{\hat{V}_s^*} + j\frac{XP + RQ}{\hat{V}_s^*}, \quad (2)$$

where, $\hat{V}_s$ denotes a value of a voltage vector at the sending end, that is, the bus 106;

$\hat{V}_R$ denotes a value of a voltage vector at the receiving end, that is, the bus 110; and $\Delta \hat{V}$ denotes a value of a voltage drop between the sending end and the receiving end.

The voltage drop $\Delta \hat{V}$ can be considered equal to the real part in equation (2) since the phase difference between $\hat{V}_s$ and $\hat{V}_R$ is considered to be negligible.

Considering $\hat{V}^*_s = |V_s| = V_s$ = absolute value of $V_s$, equation 2 can be re-written as below:

$$V \approx \frac{RP + XQ}{V_s}. \quad (3)$$

If the sending end voltage at bus 106 is considered as a base voltage or per unit voltage, equation 3 can be re-written as:

$$\Delta V \approx RP + XQ. \quad (4)$$

Equation (4) shows the dependency of the voltage drop $\Delta V$ on the active component R as well as on the reactive component X.

When a distributed generator (DG) such as a solar PV system is integrated to one of the buses, for example at bus 110 at the receiving end, the power transfer increases the voltage of the respective bus 110 compared to bus 106. At this condition, the voltage at the receiving end can be written as:

$$V_R \approx XQ + RP + V_S. \quad (5)$$

Therefore, the direction of power flow is likely to reverse as the bus 110 to which the distributed generator is connected would be at higher voltage compared to the voltage at the sending end connected to bus 106.

This voltage drop can be expressed as:

$$\text{Voltage drop } (\Delta V) = V_{DG} - V_S \approx \frac{XQ + RP}{V_{DG}}, \quad (6)$$

where:

$V_{DG}$=Voltage at DG terminal;

$P_G$=Generated active power from the distributed generator;

$Q_G$=Generated reactive power from the distributed generator;

$Q_c$=Reactive power of shunt compensators;

$Q_L$=Reactive power consumption due to load;

$P = P_G - P_L$ = Difference between the generated power and the load demand; and $Q = (\pm Q_C - Q_L \pm Q_G)$ Inserting values of P, Q into equation (6), and considering the per unit voltage of $V_{DG}$, the voltage drop can be re-written as:

$$\text{Voltage drop}(\Delta V) = V_{DG} - V_S \approx R(P_G - P_L) + X(\pm Q_C - Q_L \pm Q_G). \quad (7)$$

The distributed generators are configured to provide a net export of active power and potentially provide or receive a net export or import of reactive power respectively. While the load is responsible for the consumption of active and reactive power, the shunt compensators are responsible for the import or export of reactive power. Due to this fact, the reactive power capacity of distributed generators is determined by the different types of energy supplies. The impact of a high level of penetration of distributed generators in a large distribution network is discussed in FIG. 2.

Figure 2:
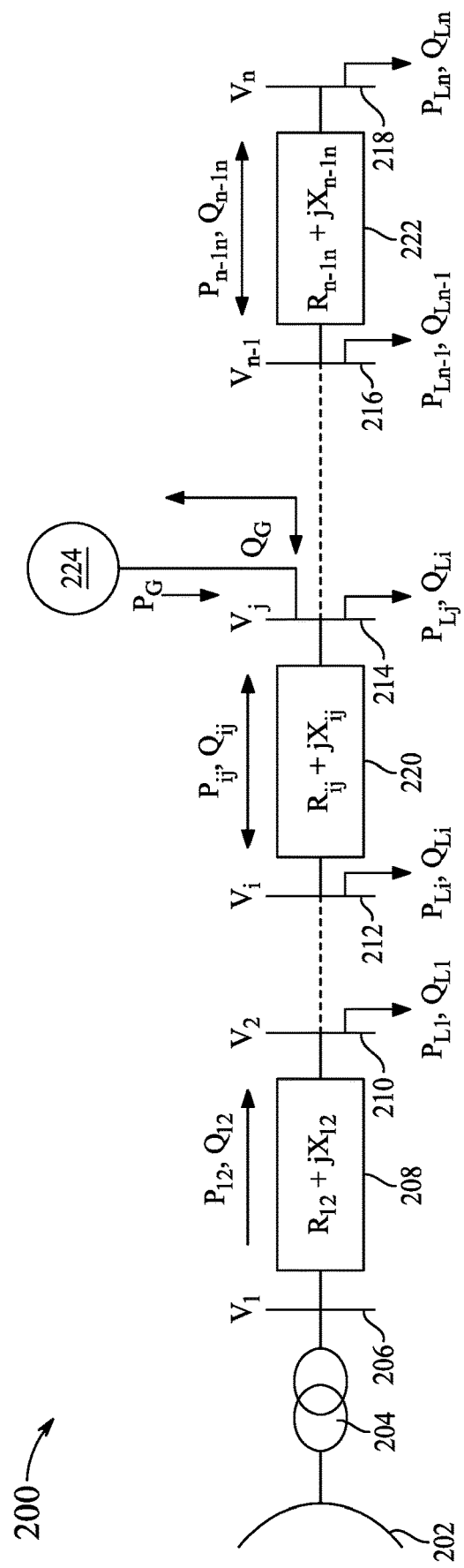
FIG. 2 illustrates a multi-bus distribution network with a distributed generator connected to a bus.

FIG. 2 illustrates a conventional multi-bus distribution network 200 with an electrical distributed generator 224 connected to bus 214. The electrical distributed generator 224 may be a solar PV system, for example. Similar to the construction of the two-bus distribution network 100 in FIG. 1, the multi-bus distribution network 200 also includes an electrical distribution station 202, an on-load tap changer 204 and transformer (indicated by the double circle symbol), a plurality of buses, that is, 206, 210, 212, 214, 216, 218, a plurality of transmission lines 208, 220, 222 with corresponding electrical impedances in $R_{ij}+jX_{ij}$ between each sending end bus (206, for example) and receiving end bus (210, for example). $P_{Lj}$ and $Q_{Li}$ represent real and reactive power, respectively, of a load (not shown) coupled with a bus, for example, bus 214. The active and reactive power are represented by $P_{ij}$ and $Q_{ij}$, respectively, where i=1 to (n−1) and j=1 to (2−n), where n represents the number of buses in the multi-bus distribution network 200.

Accordingly, equation (3) can be re-written as:

$$\Delta V_{ij} \approx \frac{R_{ij}P_{ij} + X_{ij}Q_{ij}}{V_i}, \quad (8)$$

where,
$\Delta V_{ij}$=Voltage drop from $i^{th}$ to $j^{th}$ bus;
$R_{ij}$=Resistance between $i^{th}$ and $j^{th}$ bus;
$X_{ij}$=Reactance between $i^{th}$ and $j^{th}$ bus;
$P_{ij}$=Active power flow through $i^{th}$ and $j^{th}$ bus;
$Q_{ij}$=Reactive power flow through $i^{th}$ and $j^{th}$ bus; and
$V_i$=Voltage at the $i^{th}$ bus.

Since the voltage at bus 214 is higher compared to the voltage at bus 212, the flow of power could be reversed. As such, equation (8) may be re-written as (by swapping the positions of i and j) as:

$$\Delta V_{ij} \approx \frac{R_{ij}P_{ij} + X_{ij}Q_{ij}}{V_j} \quad (9)$$

Replacing the value of $P_{ij}=(P_{Gj}-P_{Lj})$ and $Q_{ij}=(\pm Q_C - Q_L \pm Q_G)$ from equation (7), equation (9) is re-written as:

$$\text{Voltage variation } \Delta V_{ij} \approx \frac{R_{ij}(P_{Gj} - P_{Lj}) + X_{ij}(\pm Q_C - Q_L \pm Q_G)}{V_j} \quad (10)$$

where,
$P_{Gj}$=Generated active power from the distributed generator;
$Q_{Gj}$=Generated reactive power by the distributed generator;
$P_{Lj}$=Active power of the load at bus j;
$Q_{Lj}$=Reactive power of the load at bus j;
$Q_{Cj}$=Shunt allocated at $j^{th}$ bus of the multi-bus distribution network 200

To obtain a per unit expression for $V_j$, equation 10 is re-written as:

$$\Delta V_{ji} \approx R_{ij}(P_{Gj} - P_{Lj}) + X_{ij}(\pm Q_{Gj} \pm Q_{Cj} - Q_{Lj}). \quad (11)$$

Equation (11) for $\Delta V_{ji}$ is utilized to extract the reactive power capability of the solar PV based inverter system to enable non-unitary power factor operation in terms of the voltage variation in the current invention. Since, the unitary power factor of a PV based inverter system is used for harnessing active power, in non-unitary operations, the potential reactive power capability can be identified using the apparent power. As such, at an interval, an inverter of the PV system is capable of either injecting or absorbing a specified amount of reactive power $Q_{in}$.

The relationship between the real power $P_{Gj}$, the reactive power $Q_{in}$, and the apparent power $S_{Gj}$ is given by:

$$Q_{in} \leq \sqrt{S_{Gj}^2 - P_{Gj}^2}, \quad (12)$$

where $S_{Gj}$=apparent power from the PV system,
$P_{Gj}$=Real power from the PV system, and
$Q_{in}$=Reactive power from the PV system.

The reactive power ($Q_{in}$) through the PV system may be mathematically derived in terms of the voltage at bus j, when a distributed generator, in this case the PV system with inverter, is attached at bus j in the multi-bus distribution network 200, as below:

$$Q_{in} = \begin{cases} \alpha_L S\left(1 - e^{(1-V_j)}\right), & 1.05\ p.u. < V_j < 0.95\ p.u. \\ 0, & \text{otherwise} \end{cases} \quad (13)$$

where, $\alpha_L$=an active loading constant that varies in the range of (1-10), according to the active power curtailment required from the PV inverters for voltage regulation; and
$V_j$=Corresponding bus voltage at the $j^{th}$ bus.

As $Q_{in}$ is computed using equation (13), the expression for reactive power $P_{Gj}$ from the PV system is derived by re-writing equation (12), as below:

$$P_{Gj} = \begin{cases} \sqrt{S_{Gj}^2 - |Q_{in}|^2}, & 1.05\ p.u. < V_j < 0.95\ p.u. \\ P_{Gjmax}, & \text{otherwise} \end{cases} \quad (14)$$

Using $Q_{in}$ and $P_{Gj}$ from equation (13) and equation (14), the required power factor for either injecting reactive power or absorbing reactive power is given by:

$$\text{Power factor} = \frac{(P_{Gj})}{(P_{Gj} + Q_{in})} \quad (15)$$

Accordingly, the reactive power support from the PV inverter is able to regulate the critical bus voltage $V_j$ during a system fault occurrence. The aspects described with respect to equation (1) to equation (15) and FIG. 1 and FIG. 2 are used to implement a reactive power support system for a radial distribution network, as described in detail with respect to FIG. 3.

Figure 3:
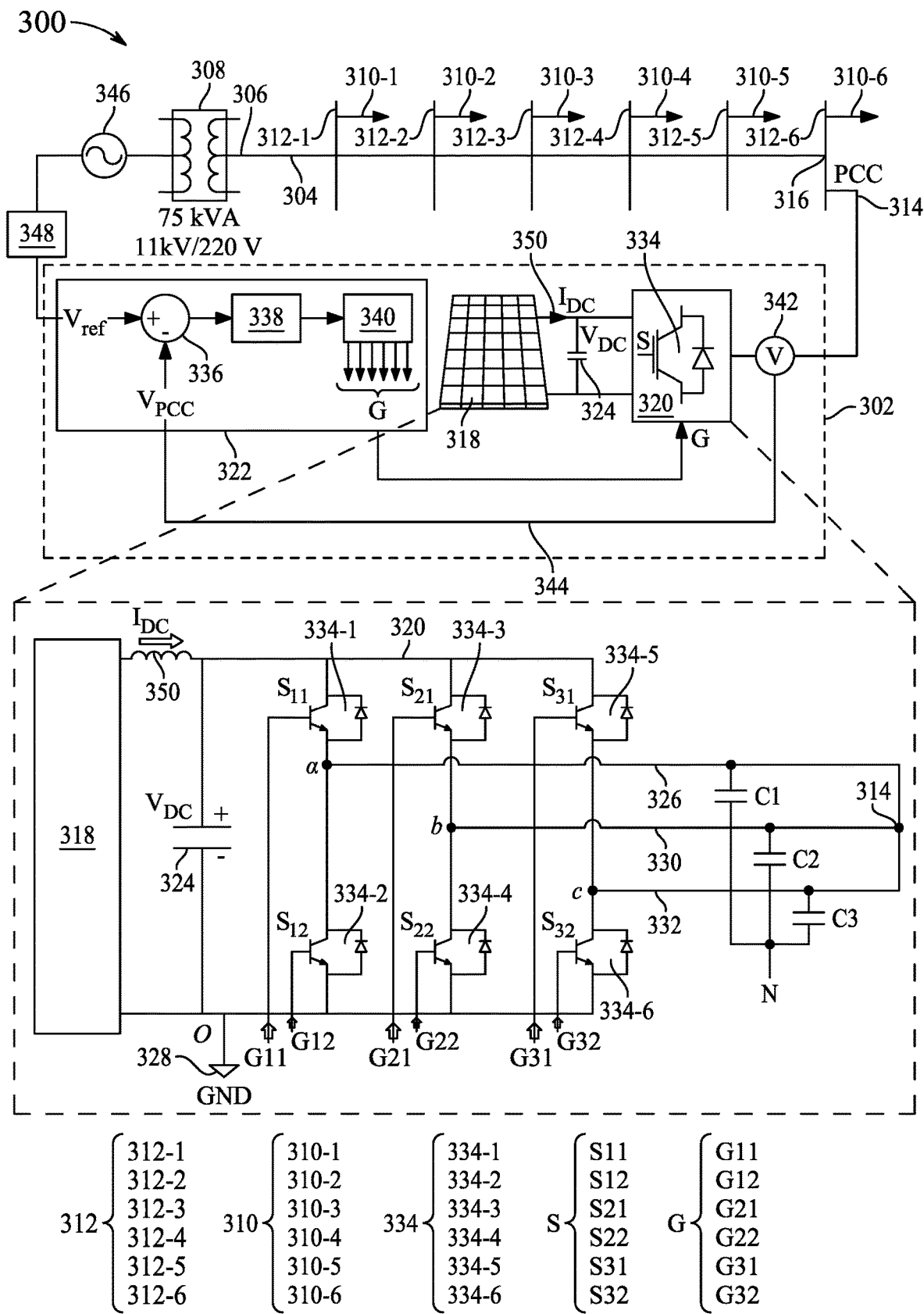
FIG. 3 illustrates a radial distribution network including a reactive power support system, according to certain embodiments.

FIG. 3 illustrates a radial distribution network 300 including a reactive power support system 302, according to an embodiment. The reactive power support system 302 is configured to either inject or absorb a reactive power to the radial distribution network 300 during one or more faults or disturbances. The one or more disturbances may include L, LL, LLL, L-G, LL-G, or LLL-G faults that may occur at any bus in the radial distribution network 300 connected to a PV array. The reactive power support system 302 is described in detail later in the description.

The radial distribution network 300 includes a grid transformer 308. The grid transformer 308 may be selected from the group containing dry type transformers, step-down transformers, distribution transformers, polyphase transformers, single-phase transformers, iron core transformers, medium voltage transformers, three-phase transformers or the like. The transformer may be a step-up type or a step-down type of transformer.

The radial distribution network 300 includes a radial distribution transmission line 304 for transmitting electrical power from a substation or a grid network 346 to a customer, end user or load 310. The radial distribution transmission line 304 is connected at a first end 306 to the grid transformer 308.

The radial distribution network 300 includes one or more loads 310, for example loads 310-1, 310-2, 310-3, 310-4, 310-5, and 310-6. Each load 310 is connected by a respective load bus 312 to the radial distribution transmission line 304. The load busses 312 are represented by 312-1, 312-2, 312-3, 312-4, 312-5, and 312-6. The loads may be an industrial load, a residential load or the like.

The radial distribution network 300 includes a point of common coupling (PCC) 314 connected to a second end 316 of the radial distribution transmission line 304. The second end 316 of the radial distribution transmission line 304 is connected to the load bus 312-6.

The radial distribution network 300 further includes the grid network 346. The grid network 346 is coupled with a grid controller 348 for controlling the operation and/or monitoring various parameters related to the grid network 346. The grid controller 348 is also configured to measure the voltage of the grid network 346. The measured voltage of the grid network 346 acts as a reference voltage ($V_{ref}$). The measured reference voltage ($V_{ref}$) is fed as input to the reactive power support system 302. Further, the grid network 346 is connected to the grid transformer 308. The grid network 346 could be a microgrid, a power grid, a wide area synchronous grid, a super grid or the like. In an aspect, the radial distribution network 300 may further include an electrical distribution station (not shown). The electrical distribution station (not shown) is connected to the grid network 346. The electrical distribution station may be similar to the electrical distribution station 102, 202 as discussed earlier in FIG. 1 and FIG. 2. The radial distribution network 300 may also include an on-load tap changer (OLTC) (204, shown in FIG. 2). The on-load tap changer may be electrically connected between the grid network 346 and the grid transformer 308. The OLTC is substantially similar to the OLTC 104, 204 as discussed earlier in FIG. 1 and FIG. 2. The OLTC is configured to adjust the voltage of the grid transformer 308 to provide a constant voltage at the first end 306 of the radial distribution transmission line 304.

The radial distribution network 300 further includes the reactive power support system 302. The reactive power support system 302 includes at least one photovoltaic module 318. The photovoltaic module 318 may be a single solar panel or an array of solar panels. The photovoltaic module 318 may be a monocrystalline type, a polycrystalline type, a thin-film type or a passivated emitter and rear contact (PERC) type solar panel.

The reactive power support system 302 of the radial distribution network 300 further includes a solar power inverter 320. The solar power inverter 320 is connected in parallel with at least one photovoltaic module 318. A first output terminal of the photovoltaic module 318 is connected with one end of an inductor 350 through which the DC current $I_{DC}$ generated by the PV panel 318 flows. Another end of the inductor 350 is connected with a first input terminal of the solar power inverter 320. One end of a capacitor 324 is connected with another end of the inductor 350 and thus also connected with the first input terminal of the solar power inverter 320. A second output terminal of the photovoltaic module 318 is connected with a second input terminal of the solar power inverter 320 and also with another end of the capacitor 324. As such, the capacitor 324 is in parallel with the photovoltaic module 318 and the solar power inverter 320. The solar power inverter 320 may be selected from a string inverter, a microinverter, a power optimizer type inverter, a hybrid inverter or the like, known in the art.

The constructional detail of the solar power inverter 320 is further explained herein. A zoomed view of the solar power inverter 320 along with the photovoltaic module 318, the inductor 350 and the capacitor 324 is also shown in FIG. 3. The solar power inverter 320 includes a set of one or more transistors S. For example, the solar power inverter 320 includes a first transistor $S_{11}$. A collector terminal of the first transistor $S_{11}$ is connected to a positive terminal of the capacitor 324. The emitter terminal of the first transistor $S_{11}$ is connected to the point of common coupling 314 by a first phase transmission line 326. The solar power inverter 320 further includes a second transistor $S_{12}$. A collector terminal of the second transistor $S_{12}$ is connected to the first phase transmission line 326, whereas an emitter of the second transistor $S_{12}$ is connected to a ground terminal or a zero potential terminal or a reference potential terminal 328. The solar power inverter 320 further includes a third transistor $S_{21}$. A collector terminal of the third transistor $S_{21}$ is connected to the positive terminal of the capacitor 324 whereas an emitter terminal of the third transistor $S_{21}$ is connected to the point of common coupling 314 by a second phase transmission line 330. The solar power inverter 320 further includes a fourth transistor $S_{22}$. A collector terminal of the fourth transistor $S_{22}$ is connected to the second phase transmission line 330 whereas an emitter terminal of the fourth transistor $S_{22}$ is connected to the ground terminal 328. The solar power inverter 320 further includes a fifth transistor $S_{31}$. A collector terminal of the fifth transistor $S_{31}$ is connected to the positive terminal of the capacitor 324 whereas an emitter terminal of the fifth transistor $S_{31}$ is connected to the point of common coupling 314 by a third phase transmission line 332. The solar power inverter 320 further includes a sixth transistor $S_{32}$. A collector terminal of the sixth transistor $S_{32}$ is connected to the third phase transmission line 332 whereas an emitter terminal of the sixth transistor $S_{32}$ is connected to the ground terminal 328. The first phase transmission line 326, the second phase transmission line 330 and the third phase transmission line 332 may have a connection of capacitors C1, C2 and C3, respectively to act as a filter circuit.

Each transistor S is paired with a respective reversed biased diode 334. Each reversed biased diode 334 is connected in parallel with the respective transistor S. For example, a reversed biased diode 334-1 is connected in parallel to the first transistor $S_{11}$, a reversed biased diode 334-2 is connected in parallel to the second transistor $S_{12}$, a reversed biased diode 334-3 is connected in parallel to the third transistor $S_{21}$, a reversed biased diode 334-4 is connected in parallel to the fourth transistor $S_{22}$, a reversed biased diode 334-5 is connected in parallel to the fifth transistor $S_{31}$ and a reversed biased diode 334-6 is connected in parallel to the sixth transistor $S_{31}$. In an aspect, the transistor may be selected from the group including a BJT, a FET, a MOSFET, a JFET, either individually or in combination.

The reactive power support system 302 of the radial distribution network 300 further includes a voltmeter 342. A first input terminal of the voltmeter 342 is connected from the output terminal of the solar power inverter 320. A second input terminal of the voltmeter 342 is connected to the point of common coupling 314. In other words, the output terminal of the solar power inverter 320 is electrically connected to the point of common coupling 314 and the voltmeter 342 is configured to measure the voltage at the point of common coupling 314.

The reactive power support system 302 of the radial distribution network 300 further includes an inverter controller 322. The inverter controller 322 includes an adder 336. The adder 336 includes two inputs. The voltage at the point of point of common coupling 314 is fed as an input to a negative input terminal of the adder 336 through a feedback transmission line 344 connected between the voltmeter 342 and the negative input of the adder 336. The feedback transmission line 344 is configured to transmit the voltage at the point of common coupling 314 to the negative input of the adder 336. Thus, the output voltage measured from the voltmeter 342 at the point of the common coupling 314 is used as input to the negative input terminal of the adder 336. Also, the grid controller 348 is configured to transmit the voltage reference signal ($V_{ref}$) to the positive input terminal of the adder 336. Therefore, the measured reference voltage ($V_{ref}$) from the grid controller 348 is fed as input to the positive input terminal of the adder 336 of the inverter controller 322. Thus, the adder 336 is configured to receive the voltage reference signal ($V_{ref}$) at the positive input terminal of the adder 336, voltage ($V_{PCC}$) at the point of common coupling 314 at the negative input terminal of the adder 336, add the voltage reference signal ($V_{ref}$) to the negative point of common coupling voltage ($V_{PCC}$) and generate an error signal ($E_s$) at an output terminal of the adder 336.

The inverter controller 322 of the reactive power support system 302 further includes a proportional integral controller 338. The proportional integral controller or a PI controller 338 is connected in series with the adder 336. The output generated by the adder 336 is fed as input to the proportional integral controller 338. For example, the proportional integral controller 338 is configured to receive the error signal ($E_s$) from the output terminal of the adder 336. The proportional integral controller 338 is further configured to sample the error signal ($E_s$) during a time window, compute the average of the error signals ($E_s$) and generate an average error signal at the output of the proportional integral controller 338.

The inverter controller 322 of the reactive power support system 302 further includes a pulse width modulator 340. The pulse width modulator 340 is also connected in series with the proportional integral controller 338. The pulse width modulator 340 is configured to receive the average error signal from the output of the proportional integral controller 338. The pulse width modulator 340 thus generate a gate control signals G based upon the average error signal. The generated gate control signal G acts as input to the solar power inverter 320. The gate control signals G may be classified as a combination of six different gate control signals, such as $G_{11}$, $G_{12}$, $G_{21}$, $G_{22}$, $G_{31}$ and $G_{32}$. A gate of each transistor S of the set of transistor gates is configured to connect to a respective one of the gate control signals G. More specifically, each gate control signal G is configured to be supplied as input to the respective gate terminal of the set of the transistors S. For example, $G_{11}$ is configured to act as input to the gate terminal of the first transistor $S_{11}$, $G_{12}$ is configured to act as input to the to the gate terminal of the second transistor $S_{12}$, $G_{21}$ is configured to act as input to the to the gate terminal of the third transistor $S_{21}$, $G_{22}$ is configured to act as input to the to the gate terminal of the fourth transistor $S_{22}$, $G_{31}$ is configured to act as input to the to the gate terminal of the fifth transistor $S_{31}$, and $G_{32}$ is configured to act as input to the to the gate terminal of the sixth transistor $S_{32}$. Thus, each gate control signal G is configured to switch a polarity of the gate of a respective transistor S of the solar power inverter 320 to switch the respective transistor S ON or OFF.

Now the operation of the reactive power support system 302 is described in detail. The grid network 346 supplies the reference voltage ($V_{ref}$) to the radial distribution transmission line 304. The buses 312 also receive the reference voltage ($V_{ref}$). The reference voltage ($V_{ref}$) voltage appears at the point of common coupling 314 connected at the bus 312-6. The grid controller 348 is configured to monitor the reference voltage ($V_{ref}$) provided by the grid network 346 and supplies the reference voltage ($V_{ref}$) to the reactive power support system 302. The reactive power support system 302 receives the reference voltage ($V_{ref}$) and supplies to the inverter controller 322 of the reactive power support system 302. The inverter controller 322 receives the reference voltage ($V_{ref}$) and supplies to the positive input terminal of the adder 336. In an embodiment, the inverter controller 322 may use a per unit reference voltage ($V_{ref}$) (that is, $V_{ref}$=1 p.u.) and supplies it to the positive input terminal of the adder 336. Accordingly, the positive input terminal of the adder 336 always receives 1 p.u as the reference voltage ($V_{ref}$). Case I: There is no fault on any load bus 312.

When there is no fault, for example an L, LL, LLL, L-G, LL-G, or LLL-G fault, on any load bus 312, the voltage at the point of common coupling 314 is equal to the voltage at the $6^{th}$ load bus 312-6 (that is, $V_{j=6}$) at which the photovoltaic module 318 with solar power inverter 320 is connected. At this time, $$V_{j=6} = V_{ref}.$$

The reactive power support system 302 receives the measured output voltage $V_{j=6}$ at the point of the common coupling 314 from the voltmeter 342 and supplies to the inverter controller 322 of the reactive power support system 302 through the feedback transmission line 344. The inverter controller 322 receives the measured output voltage $V_{j=6}$ and supplies to the negative input terminal of the adder 336. In an aspect, the inverter controller 322 may also use a per unit voltage of the PCC terminal 314 (for example, $V_{j=6}=1$ p.u.) and supplies it to the negative input terminal of the adder 336. Accordingly, the negative input terminal of the adder 336 receives 1 p.u as the voltage at PCC terminal 314.

Since, there is no fault, $V_{j=6}=V_{ref}=1$ p.u. The output of the adder 336=Grid voltage ($V_{ref}$)−Voltage at the point of common coupling ($V_{j=6}$)=0 p.u. This condition indicates a balanced state of the radial distribution transmission line 304. As such, the output through the adder 336 is zero. The output, that is, zero, is fed as input to the proportional integral controller 338. As such, the error signal is zero unit. The proportional integral controller 338 sample the zero unit during the time window, averages zero unit and generate an average error signal as zero unit only. The output as average of zero unit is further fed as input to the pulse width modulator 340. The pulse width modulator 340 receives the zero-unit as average error signal. Mathematically, the reactive power support system 302 is configured to use equation (13) and equation (14) and computes the reactive power value as $Q_{in}=0$ and the active power=$P_{Gj}=P_{Gmax}$. Also, $V_{j=6}=1$ p.u. is within the limits from equation (13). The reactive power support system 302 is further configured to compute the required power factor using equation 15. At this time, $$\text{Power factor} = P_{Gj}/(P_{Gj} + Q_{in}) = P_{Gj}/(P_{Gj} + 0) = (P_{Gmax}/P_{Gmax}) = 1$$

The power factor=1 corresponds to an average error signal as zero unit as received from the proportional integral controller 338. Also, the unity power factor indicates that the reactive power at the point of common coupling 314 equals the grid reference value. The average error signal as zero unit corresponding to power factor 1 is further fed as input to the pulse width modulator 340.

The pulse width modulator 340 receives the average error signal as zero unit and generate gate control signals G corresponding to power factor=1. In an aspect, the G is represented as a gate control signal (in vector form) (G)= [$G_{11}, G_{12}, G_{21}, G_{22}, G_{31}, G_{32}$], where $G_{ij}$=Either '0' or '1'. '0' and '1' indicates an OFF condition, the non-conducting state and the ON condition, respectively, of the respective transistor $S_{ij}$ from the set of transistor S. Moreover, respective gate control signal $G_{ij}$ is to be fed as input to the gate terminal of the respective transistor $S_{ij}$.

Accordingly, the pulse width modulator 340 is configured to generate the gate control signal G. Since, the required power factor is the unity power factor, the pulse width modulator 340 having stored the corresponding gate signal G=[$G_{11}, G_{12}, G_{21}, G_{22}, G_{31}, G_{32}$] equivalent to unity power factor. At this time, corresponding gate signal G=[$G_{11}, G_{12}, G_{21}, G_{22}, G_{31}, G_{32}$] refers to generation of active power only when the power factor is unity as P (active power)=$P_{Gmax}$. In an example, for each reactive power value and the corresponding active power value (or the corresponding power factor value based upon the active and reactive power value), the pulse width modulator 340 may store the corresponding gate signal G in vector form. The pulse width modulator 340, based upon the gate control signal G corresponding to the unity power factor, inputs the gate control signal G corresponding to generation of active power only, to the solar power inverter 320. The gate control signals G are thus configured to switch the set of transistor gates of the solar power inverter 320 to provide only active power to the point of common coupling 314. As such, the gate control signals G switches the set of transistor gates S of the solar power inverter 320 to provide only active power to the point of common coupling 314 when the radial distribution transmission line 304 is balanced. This condition also indicates that the grid network 346 is stable and none of the buses 312 have faults of the L, LL, LLL, L-G, LL-G or LLL-G type. Therefore, the voltage measured at the point of common coupling ($V_{j=6}$) 314 is equal to the voltage reference value ($V_{ref}$) transmitted from the grid network 346.

Case II: The load bus 312 has a fault and $V_{j=6}$ is below 0.95 p.u at any moment. One of the load buses, for example, a third load bus 312-3 has a fault. In an aspect, the fault may be an LLL-G fault. In another example, the fault may be a L, LL, LLL, L-G, or LL-G type fault. Due to the LLL-G fault, the voltage profile $V_{j=6}$ at the point of common coupling 314 also fluctuates. Thus, the voltage $V_{j=6}$ at the point of common coupling 314 is not equal to the grid network voltage ($V_{ref}$) but either less than or greater than grid network voltage ($V_{ref}$). As such, the value of $V_{j=6}$ may rise above 1.05 p.u or fall below 0.95 p.u. as provided in equation 13 earlier and also given below.

$$1.05\ \text{p.u} < V_j.$$

OR $$V_j < 0.95\ \text{p.u.}$$

This condition would indicate an occurrence of the fault. During occurrence of the fault, the bus voltage of the respective load bus 312-3 needs to be regulated in order to regulate a voltage of the radial distribution transmission line 304 during the LLL-G fault on the load bus 312-3 connected to the load 310-3. Considering $V_{j=6}$ at any moment is below 0.95 p.u., that is, 0.90 p.u., for example. At this time, $$V_{j=6} < V_{ref}.$$

The reactive power support system 302 receives the measured output voltage $V_{j=6}$ (for example, 0.90) at the point of the common coupling 314 from the voltmeter 342 and supplies (in an example, $V_j=0.90$) to the inverter controller 322 of the reactive power support system 302 through the feedback transmission line 344. The inverter controller 322 receives the measured output voltage $V_{j=6}$ and supplies to the negative input terminal of the adder 336. In an aspect, the inverter controller 322 uses per unit voltage of PCC terminal 314 (that is, $V_{j=6}=0.90$ p.u.) and supplies it to the negative input terminal of the adder 336. Accordingly, the negative input terminal of the adder 336 receives less than 0.95 p.u. (that is, 0.90 p.u) from the voltage at PCC terminal 314. The output of the adder 336 is considered as an error signal.

Error signal=Grid voltage ($V_{ref}$)−Voltage at the point of common coupling ($V_{j=6}$). The error signal >0 p.u. since the grid voltage ($V_{ref}$)>($V_{j=6}$). This condition indicates an unbalanced state of the radial distribution transmission line 304. As such, the output through the adder 336 is a non-zero and positive value as the error signal. The error signal as the output of the adder 336, that is, positive non-zero value, is fed as input to the proportional integral controller 338. The proportional integral controller 338 samples the positive non-zero value during the time window. Further, the proportional integral controller 338 averages the positive non-zero value and generate an average of the positive non-zero value at the output terminal of the proportional integral controller 338. The output as average of the positive non-zero value is further fed as input to the pulse width modulator 340. The inverter controller 322 computes the reactive power value $Q_{in}$ using equation 13, as below:

$$Q_{in} = \begin{cases} {}_\alpha{}^L S\left(1 - e^{(1-V_j)}\right), & 1.05\ p.u. < V_j < 0.95\ p.u. \\ 0, & \text{otherwise} \end{cases} \quad (13)$$

This time, the reactive power value as $Q_{in}$ turns out to be 'Negative' after putting value of $V_j<0.95$ (that is, 0.90 p.u.). This indicates that the reactive power $Q_{in}$ at the point of common coupling 314 is less than a grid reference value. As such, greater than a unity power factor is required in order to regulate the voltage of the radial distribution transmission line 304 during the three-phase to ground fault (LLL-G) on the load bus 312-3 connected to the load 310-3.

The inverter controller 322 of the reactive power support system 302 computes the active power $P_{Gj}$ by using equation (14) and putting the negative value of $Q_{in}$ in the equation (14) as below:

$$P_{Gj} = \begin{cases} \sqrt{S_{Gj}^2 - |Q_{in}|^2}, & 1.05\ p.u. < V_j < 0.95\ p.u. \\ P_{Gjmax}, & \text{otherwise} \end{cases} \quad (14)$$

The computed active power $P_{Gj}$ is positive. The inverter controller 322 of the reactive power support system 302 is further configured to use the computed value of the active power $P_{Gj}$ (positive) and the reactive power $Q_{in}$ (negative) in equation (15) to compute the required power factor, as below:

$$\text{Power factor} = \frac{(P_{Gj})}{(P_{Gj} + Q_{in})}. \quad (15)$$

From equation (15), Power factor=$P_{Gj}/(P_{Gj}+(-Q_{in}))=P_{Gj}/(P_{Gj}-Q_{in})>1$ The power factor >1 corresponds that greater than a unity power factor is required to absorb reactive power at the point of common coupling 314 in order to regulate the voltage of the radial distribution transmission line 304 during the LLL-G fault on the load bus 312-3 connected to the load 310-3. Accordingly, the average of the positive non-zero value as average error signal corresponding to the necessary power factor grater then 1 (unity) is further fed as input to the pulse width modulator 340.

The pulse width modulator 340 receives the average of the positive non-zero error signal and generates gate control signals G corresponding to power factor >1 necessary to absorb the reactive power at the point of common coupling 314 in order to regulate the voltage of the radial distribution transmission line 304 during the LLL-G fault on the load bus 312-3 connected to the loads 310-3. In an aspect, the G could be represented as a gate control signal (in vector form) (G)=[$G_{11}$, $G_{12}$, $G_{21}$, $G_{22}$, $G_{31}$, $G_{32}$], where $G_{ij}$=Either '0' or '1'. '0' indicates OFF condition or non-conducting state and '1' indicates ON condition, respectively, of the respective transistor $S_{ij}$ from the set of transistor S. Moreover, respective gate control signal $G_{ij}$ is to be fed as input to the gate terminal of the respective transistor $S_{ij}$.

Accordingly, the pulse width modulator 340 of the inverter controller 322 generates the gate control signal G corresponding to power factor greater than unity. Thus, the gate control signal G switches the set of transistor gates of the solar power inverter 320 to operate at greater than the unity power factor.

Since, the required power factor is greater than unity, the pulse width modulator 340 having stored the corresponding gate signal G=[$G_{11}$, $G_{12}$, $G_{21}$, $G_{22}$, $G_{31}$, $G_{32}$] equivalent to greater then unity power factor. At this time, the gate signal G=[$G_{11}$, $G_{12}$, $G_{21}$, $G_{22}$, $G_{31}$, $G_{32}$] refers to generation of corresponding active power as well as reactive power as computed in equation (13) and equation (14) that yields the power factor >1 (unity).

The pulse width modulator 340, based upon the gate control signal G corresponding to greater than the unity power factor, inputs the gate control signal G corresponding to generation of active power as well as reactive power as computed from equations 13 and 14, to the solar power inverter 320. The gate control signals G are thus configured to switch the set of transistor gates of the solar power inverter 320 to provide active power as well as a reactive power as computed from equations 13 and 14, corresponding to power factor greater than unity, to the point of common coupling 314. The point of common coupling 314 absorbs the reactive power. As such, the voltage of the radial distribution transmission line 304 is regulated during the three-phase to ground fault on the load bus 312-3 connected to the load 310-3. At this point, the gate control signals G switches the set of transistor gates S of the solar power inverter 320 to provide the active power as well as reactive power corresponding to power factor greater than 1 (unity) to the point of common coupling 314 to regulate the voltage of the radial distribution transmission line 304 during the three-phase to ground fault on the load bus 312-3 connected to the load 310-3. Accordingly, the voltage of the radial distribution transmission line 304 is regulated.

Case III: When one of the load bus 312 has a fault and $V_{j=6}$ is above 1.05 p.u at any moment. One of the load bus 312, for example, a third load bus 312-3 has a fault. In an aspect, the fault may be again an LLL-G fault. In another example, the fault may be a L, LL, LLL, L-G, or LL-G type fault. Due to the LLL-G fault, the voltage profile $V_{j=6}$ at the point of common coupling 314 also fluctuates. Thus, the voltage $V_{j=6}$ at the point of common coupling 314 is not equal to the grid network voltage ($V_{ref}$) but either less than or grater then grid network voltage ($V_{ref}$). As such, the value of $V_{j=6}$ may rise above 1.05 p.u or fall below 0.95 p.u. as provided in equation 13 earlier and also given below.

1.05 p.u<$V_j$.

OR $V_j$<0.95 p.u.

This condition indicates an occurrence of the fault. During an occurrence of a fault, the bus voltage of the respective load bus 312-3 must be regulated in order to regulate the voltage of the radial distribution transmission line 304 during the LLL-G fault on the load bus 312-3 connected to the load 310-3. Considering $V_{j=6}$ at any moment is above 1.05 p.u. (1.10 p.u. for example). At this time, $V_{j=6}>V_{ref}$.

The reactive power support system 302 receives the measured output voltage $V_{j=6}$ (1.10 p.u. for example) at the point of the common coupling 314 from the voltmeter 342 and supplies (that is, $V_j$=1.10 p.u.) to the inverter controller 322 of the reactive power support system 302 through the feedback transmission line 344. The inverter controller 322 receives the measured output voltage $V_{j=6}$ and supplies to the negative input terminal of the adder 336. In an aspect, the inverter controller 322 uses per unit voltage of PCC terminal 314 (that is, $V_{j=6}$=1.10 p.u.) and supplies it to the negative input terminal of the adder 336. Accordingly, the negative input terminal of the adder 336 receives greater than 1.05 p.u. (for example, 1.10 p.u) from the voltage at PCC terminal 314. Now, the output of the adder 336 is considered as an error signal.

Error signal=Grid voltage ($V_{ref}$)−Voltage at the point of common coupling ($V_{j=6}$)=1.00 p.u.-1.10 p.u.

The error signal <0 p.u, since the grid voltage ($V_{ref}$)< ($V_{j=6}$)

This condition indicates an unbalanced state of the radial distribution transmission line 304. The output through the adder 336 is a non-zero and a negative value as the error signal. The error signal as the output of the adder 336, that is, negative non-zero value, is fed as input to the proportional integral controller 338.

The proportional integral controller 338 samples the negative non-zero value during the time window. Further, the proportional integral controller 338 averages the negative non-zero value and generate an average of the negative non-zero value at the output terminal of the proportional integral controller 338. The output as average of the negative non-zero value is further fed as input to the pulse width modulator 340.

Mathematically, the inverter controller 322 of the reactive power support system 302 computes the reactive power value $Q_{in}$ using equation 13, as below:

$$Q_{in} = \begin{cases} a^L S(1 - e^{(1-V_j)}), & 1.05\ p.u. < V_j < 0.95\ p.u. \\ 0, & \text{otherwise} \end{cases} \quad (13)$$

This time, the reactive power value as $Q_{in}$ turns out to be 'Positive' after putting value of $V_j$>1.05 (that is, 1.10 p.u.). This indicates that the reactive power $Q_{in}$ at the point of common coupling 314 is greater than a grid reference value. As such, less than a unity power factor is required in order to regulate the voltage of the radial distribution transmission line 304 during the three-phase to ground fault (LLL-G) on the load bus 312-3 connected to the load 310-3.

Mathematically, the inverter controller 322 of the reactive power support system 302 computes the active power $P_{Gj}$ by using equation (14) and putting the positive value of $Q_{in}$ in the equation 14 as below:

$$P_{Gj} = \begin{cases} \sqrt{S_{Gj}^2 - |Q_{in}|^2}, & 1.05\ p.u. < V_j < 0.95\ p.u. \\ P_{Gjmax}, & \text{otherwise} \end{cases} \quad (14)$$

The computed active power $P_{Gj}$ is positive. The inverter controller 322 of the reactive power support system 302 is further configured to use the computed value of the active power $P_{Gj}$ (positive) and the reactive power $Q_{in}$ (positive) in equation 15 to compute the required power factor, as below:

$$\text{Power factor} = \frac{(P_{Gj})}{(P_{Gj} + Q_{in})} \quad (15)$$

From equation (15), Power factor=$P_{Gj}$/($P_{Gj}$+$Q_{in}$)=$P_{Gj}$/($P_{Gj}$+$Q_{in}$)<1. The power factor <1 corresponds that less than a unity power factor is required to provide reactive power at the point of common coupling 314 in order to regulate the voltage of the radial distribution transmission line 304 during the LLL-G fault on the load bus 312-3 connected to the load 310-3. Accordingly, the average of the negative non-zero value as average error signal corresponding to the necessary power factor less than 1 (unity) is further fed as input to the pulse width modulator 340.

The pulse width modulator 340 receives the average of the negative non-zero error signal and generates gate control signals G corresponding to power factor <1 necessary to provide the reactive power at the point of common coupling 314 in order to regulate the voltage of the radial distribution transmission line 304 during the LLL-G fault on the load bus 312-3 connected to the load 310-3. In an aspect, the G could be represented as a gate control signal (in vector form) (G)=[$G_{11}$, $G_{12}$, $G_{21}$, $G_{22}$, $G_{31}$, $G_{32}$], where $G_{ij}$=Either '0' or '1'. '0' indicates OFF condition or non-conducting state and '1' indicates ON condition, respectively, of the respective transistor $S_{ij}$ from the set of transistor S. Moreover, respective gate control signal $G_{ij}$ is to be fed as input to the gate terminal of the respective transistor $S_{ij}$.

Accordingly, the pulse width modulator 340 of the inverter controller 322 generates the gate control signal G corresponding to power factor less than unity. The gate control signal G would switch the set of transistor gates of the solar power inverter 320 to operate at less than the unity power factor.

Since, the required power factor is less than unity, the pulse width modulator 340 having stored the corresponding gate signal G=[$G_{11}$, $G_{12}$, $G_{21}$, $G_{22}$, $G_{31}$, $G_{32}$] equivalent to less than unity power factor. At this time, the gate signal G=[$G_{11}$, $G_{12}$, $G_{21}$, $G_{22}$, $G_{31}$, $G_{32}$] refers to generation of corresponding active power as well as reactive power as computed in equation 13 and 14 that yields the power factor <1 (unity).

The pulse width modulator 340, based upon the gate control signal G corresponding to less than the unity power factor, inputs the gate control signal G corresponding to generation of active power as well as reactive power as computed from equations 13 and 14, to the solar power inverter 320. The gate control signals G are thus configured to switch the set of transistor gates of the solar power inverter 320 to provide active power as well as a reactive power as computed from equations 13 and 14, corresponding to power factor less than unity, to the point of common coupling 314. This provides additional reactive power at the point of common coupling 314. As such, the voltage of the radial distribution transmission line 304 is regulated during the three-phase to ground fault on the load bus 312-3 connected to the load 310-3. The gate control signals G switches the set of transistor gates S of the solar power inverter 320 to provide the active power as well as reactive power corresponding to power factor less than 1 (unity) to the point of common coupling 314 to regulate the voltage of the radial distribution transmission line 304 during the three-phase to ground fault on the load bus 312-3 connected to the load 310-3. Accordingly, the voltage of the radial distribution transmission line 304 is regulated.

Accordingly, whenever the voltage on the load bus 312 fluctuates due to, for example LLL-G type fault, the reactive power support system 302 immediately provides the momentarily necessary reactive power support by either injecting the reactive power or by absorbing the reactive power to the point of common coupling 314 by the inverter controller 322 connected to the solar power inverter 320. Based upon the voltage value available at the point of common coupling 314 as compared to the reference voltage of the grid network 346, the inverter controller 322 is provide gate control signals G which switch the set of transistor gates of the solar power inverter 320 to operate at less than or greater than a unity power factor to provide reactive power or to absorb reactive power respectively at the point of common coupling 314 in order to regulate the voltage of the radial distribution transmission line 304 during a three-phase to ground fault on the load bus 312 connected to one of the loads 310. In an embodiment, the inverter controller 322 of the reactive power support system 302 may include a relation curve, such as a control curve between active/reactive power/power factor and corresponding value of gate control signals necessary to generate corresponding power factor equivalent to generate corresponding active or reactive power in order to regulate the voltage of the radial distribution transmission line 304 during the three-phase to ground fault on the load bus 312 connected to one of the loads 310. Also, the generation of more than the unity power factor, equal to unity power factor or less then unity power by the inverter controller 322 by controlling the gate control signals G based upon the reference voltage and the voltage at the point of common coupling 314 is a continuous and an iterative process and the aforementioned process is regularly computed for the necessary reactive power or active power or both, required till the voltage profile on the respective load bus 312 is completely stabilized.

Figure 4:
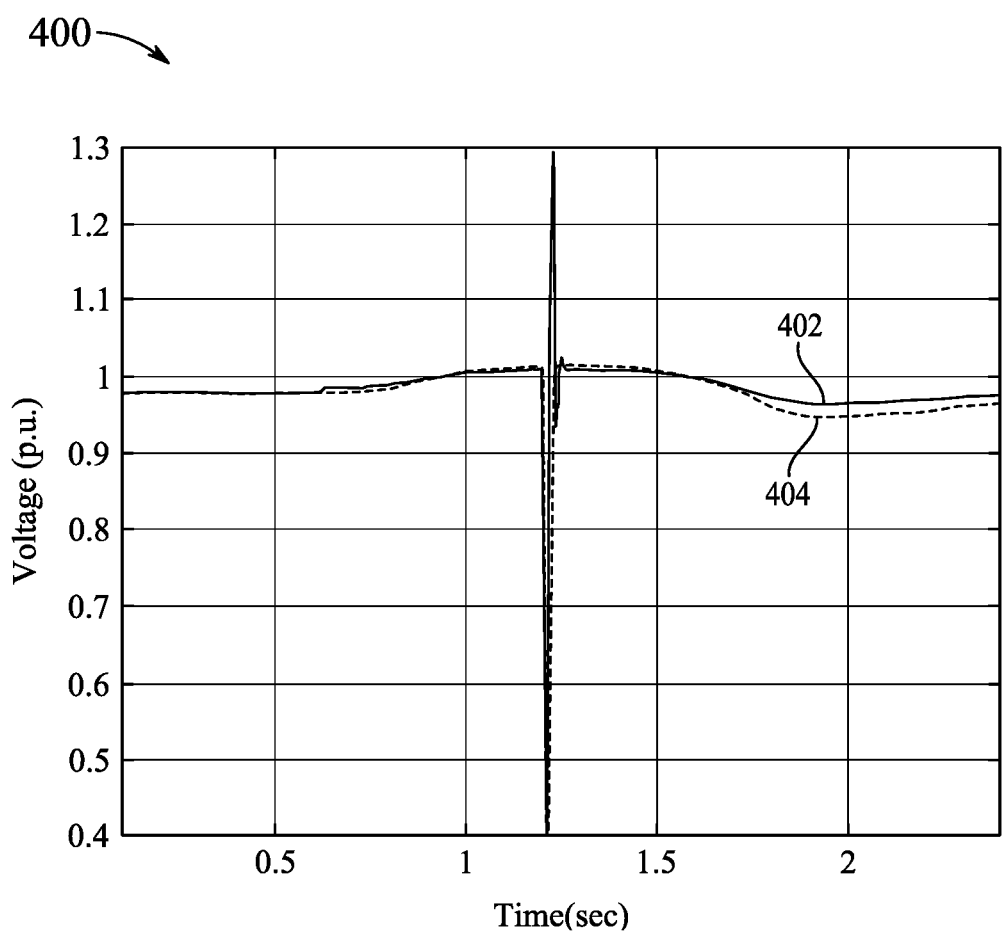
FIG. 4 illustrates a voltage profile during an LLL-G fault at a first bus, according to certain exemplary embodiments.

FIG. 4 illustrates a voltage profile 400 during LLL-G fault at a first load bus 312-1, according to an aspect of the present disclosure. To analyze the efficacy of the solar power inverter 320 under control of the inverter controller 322, the LLL-G fault was injected at the first load bus 312-1 at time t=1 and cleared in 20 msec. A plotline 402 shows observed voltage profile 400 at the point of common coupling ($V_{PCC}$) when the inverter controller 322 was actively providing grater then unity power factor when the reactive power at the point of common coupling 314 was less than a grid reference value due to LLG-fault at the first load bus 312-1, and when the inverter controller 322 was actively providing less then then unity power factor when the reactive power at the point of common coupling 314 was greater than the grid reference value due to LLG-fault at the first load bus 312-1. The voltage profile 400 incurred a maximum voltage magnitude during the fault condition as the stability was limited due to the isolation of the feeder. However, at t=2 sec the voltage was recovered. It was clear from the plotline 402 that the voltage profile was found to be under permissible limits (0.95-1.05 p.u.) while also satisfying the IEEE 1547-2018 distributed energy resource requirement. On the other hand, a plotline 404 shows a voltage profile at the point of common coupling ($V_{PCC}$) when the inverter controller 322 was removed or not used with the solar power inverter 320. From the result of the plotline 404 it was clear that, without the integration of the inverter controller 322 of the reactive power support system 302, the voltage after fault clearance was not recovered and remains below 0.95 p.u. The result from both plotlines 402, 404 indicates that the inverter controller 322 of the reactive power support system 302 successfully stabilized the voltage profile at the point of common coupling 314 even when the LLL-G fault occurred at first load bus 312-1.

Figure 5A:
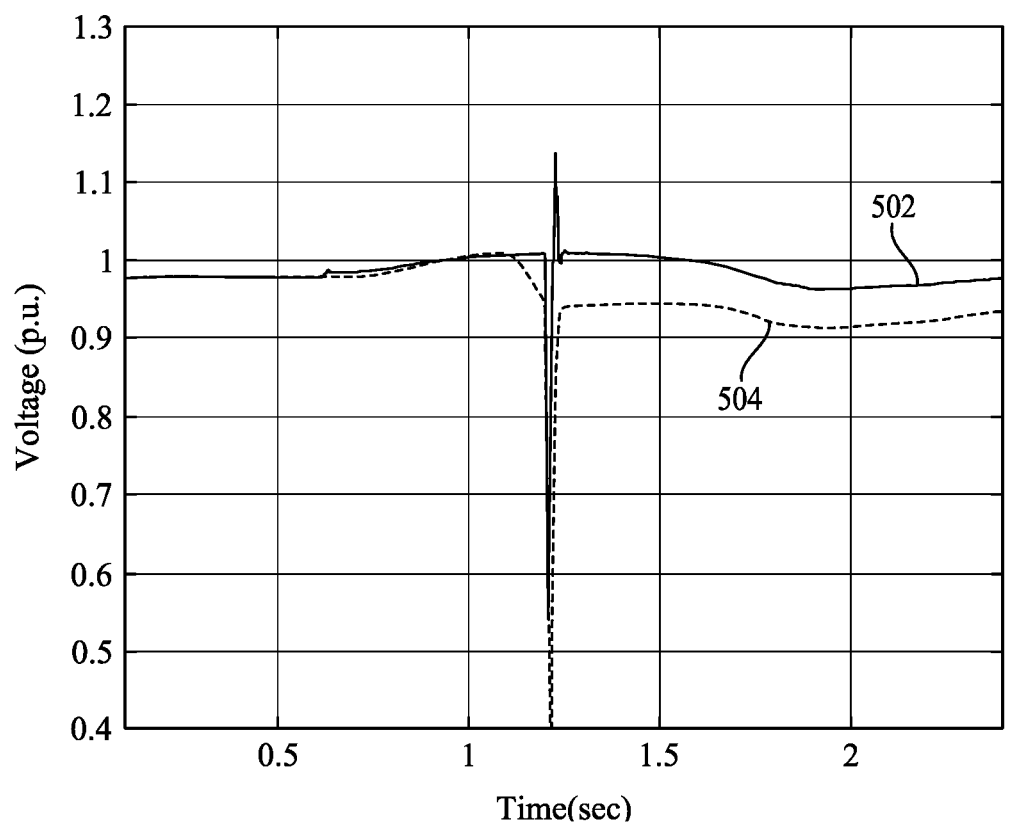
FIG. 5A illustrates a voltage profile during the LLL-G fault at a fourth bus, according to certain exemplary embodiments.

FIG. 5A illustrates a voltage profile 500-1 during LLL-G fault at a fourth load bus 312-4, according to an aspect. To again analyze the efficacy of the solar power inverter 320 under control of the inverter controller 322, the LLL-G fault was again injected at the fourth load bus 312-4 at time t=1 and again cleared in 20 msec. A plotline 502 shows observed voltage profile 500-1 at the point of common coupling ($V_{PCC}$) during LLL-G fault at a fourth load bus 312-4. It was clear from the plotline 502 that the fault at the fourth load bus 312-4 experienced a comparatively lower magnitude of overvoltage and undervoltage during the fault occurrence. Also, the voltage profile 500-1 was again found to be under permissible limits (0.95-1.05 p.u.) while also satisfying the IEEE 1547-2018 distributed energy resource requirement. On the other hand, a plotline 504 shows a voltage profile at the point of common coupling ($V_{PCC}$) when the inverter controller 322 was removed or not used with the solar power inverter 320. From the result of the plotline 504 it was clear that, without the integration of the inverter controller 322 of the reactive power support system 302, the voltage after fault clearance was not recovered and remains below 0.95 p.u again. The result from both plotlines 502, 504 indicates that the inverter controller 322 of the reactive power support system 302 successfully stabilized the voltage profile at the point of common coupling 314 even when the LLL-G fault occurred at the fourth load bus 312-4.

Figure 5B:
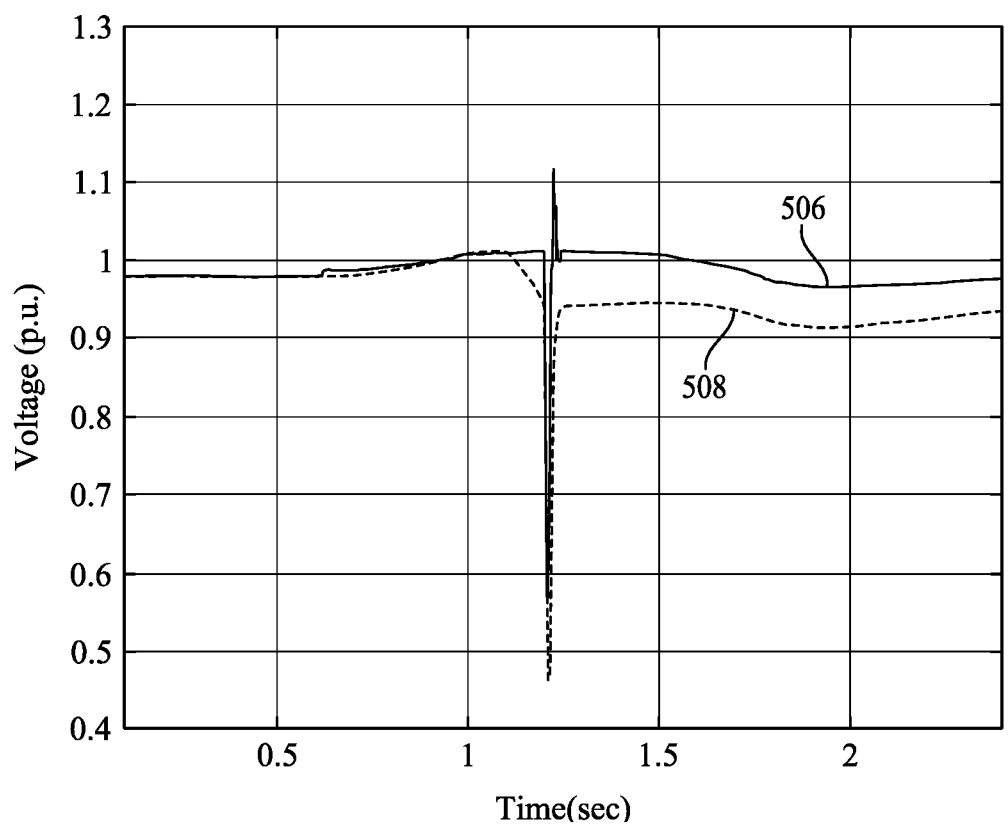
FIG. 5B illustrates a voltage profile during the LLL-G fault at a sixth bus, according to certain exemplary embodiments.

FIG. 5B illustrates a voltage profile 500-2 during LLL-G fault at the sixth load bus 312-6, according to an exemplary embodiment. To again analyze the efficacy of the solar power inverter 320 under control of the inverter controller 322, the LLL-G fault was again injected third time at the sixth load bus 312-6 at time t=1 and again cleared in 20 msec. A plotline 506 shows observed voltage profile 500-2 at the point of common coupling ($V_{PCC}$) during LLL-G fault at the sixth load bus 312-6. It was again clear from the plotline 506 that the fault at the sixth load bus 312-6 also experienced a comparatively lower magnitude of overvoltage and undervoltage during the fault occurrence. Also, the voltage profile 500-2 was again found to be under permissible limits (0.95-1.05 p.u.) while also satisfying the IEEE 1547-2018 distributed energy resource requirement. On the other hand, a plotline 508 shows a voltage profile 500-2 at the point of common coupling ($V_{PCC}$) when the inverter controller 322 was removed or not used with the solar power inverter 320. From the result of the plotline 508 it was clear that, without the integration of the inverter controller 322 of the reactive power support system 302, the voltage after fault clearance was not recovered and remains below 0.95 p.u again. The result from both plotlines 506, 508 indicates that the inverter controller 322 of the reactive power support system 302 again successfully stabilized the voltage profile at the point of common coupling 314 even when the LLL-G fault occurred at the sixth load bus 312-6.

Figure 6:
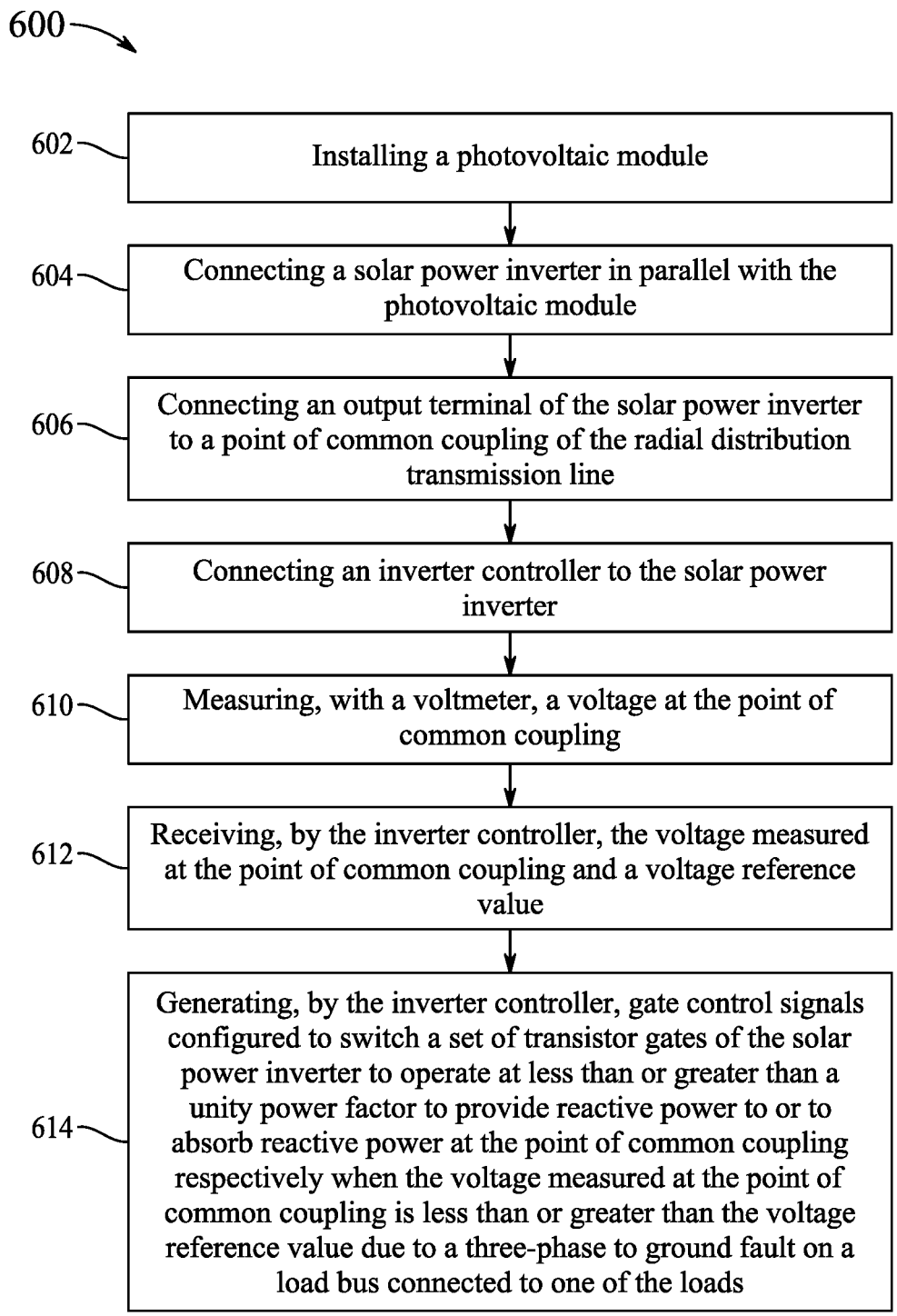
FIG. 6 illustrates a flowchart of a method of providing a reactive power support to a radial distribution network, according to certain embodiments.

FIG. 6 illustrates a flowchart of a method 600 of providing a reactive power support to a radial distribution network 300, according to an aspect. The reactive power support is provided by a photovoltaic module to the grid connected radial distribution network 300. The radial distribution network 300 is connected to a plurality of load buses 312. The method is performed in the inverter controller 322 as described in FIG. 3. The method 600 is described in conjunction with FIG. 3 and various experimental observations in FIG. 4, FIG. 5A and FIG. 5B. Various steps of the method 600 are included through blocks in FIG. 6. One or more blocks may be combined or eliminated to achieve the method 600 of providing the reactive power support to the radial distribution network 300, without departing from the scope of the present disclosure.

At step 602, the method 600 includes, installing a photovoltaic module. The photovoltaic module includes a photovoltaic module 318, a capacitor 324 and an inductor 350 connected to the photovoltaic module 318. A first end 306 of the radial distribution transmission line 304 is also connected to a grid transformer 308. Moreover, plurality of loads 310 are also connected in parallel the radial distribution transmission line 304.

At step 604, the method 600 includes connecting the solar power inverter 320 in parallel with the photovoltaic module.

At step 606, the method 600 includes connecting an output terminal of the solar power inverter 320 to a point of common coupling 314 of the radial distribution transmission line 304.

At step 608, the method 600 includes connecting an inverter controller 322 to the solar power inverter 320.

At step 610, the method 600 includes measuring, with a voltmeter 342, a voltage at the point of common coupling 314.

At step 612, the method 600 includes receiving, by the inverter controller 322, the voltage measured at the point of common coupling 314 and a voltage reference value. The voltage reference value is received from the grid controller 348. The grid controller 348 is connected with the grid network 346 and configured to receive the voltage from the grid network 346 that acts as the reference voltage. The reference voltage is fed to an adder 336 of the inverter controller 322.

At step 614, the method 600 includes generating, by the inverter controller 322, gate control signals G configured to switch a set of transistor gates of the solar power inverter 320 to operate at less than or greater than a unity power factor to provide reactive power to or to absorb reactive power at the point of common coupling 314, respectively when the voltage measured at the point of common coupling 314 is less than or greater than the voltage reference value due to a three-phase to ground fault on the load bus 312 connected to one of the loads 310.

Embodiments of the disclosure is illustrated with respect to FIG. 1 to FIG. 6. A reactive power support system 302 for a radial distribution network 300 is described. The radial distribution network 300 includes a radial distribution transmission line 304 connected at a first end 306 to a grid transformer 308 and a plurality of loads 310. Each load 310 is connected by a load bus 312 to the radial distribution transmission line 304. The radial distribution network 300 further includes a point of common coupling 314 connected to a second end 316 of the radial distribution transmission line 304, a photovoltaic module 318 and a solar power inverter 320 connected in parallel with the photovoltaic module 318. The solar power inverter 320 has an output terminal configured to connect to the point of common coupling 314. The reactive power support system 302 for the radial distribution network 300 includes an inverter controller 322 connected to the solar power inverter 320. The inverter controller 322 is configured to provide gate control signals G which switch a set of transistor gates of the solar power inverter 320 to operate at less than or greater than a unity power factor to provide reactive power or to absorb reactive power respectively at the point of common coupling 314 in order to regulate a voltage of the radial distribution transmission line 304 during a three-phase to ground fault on the load bus 312 connected to one of the loads 310.

In an aspect, the gate control signals G are configured to switch the set of transistor gates of the solar power inverter 320 to provide active power to the point of common coupling 314 when the radial distribution transmission line 304 is balanced.

In an aspect, the reactive power support system further comprises a capacitor 324 in parallel with the photovoltaic module 318 and the solar power inverter 320; and an inductor 350 connected between the photovoltaic module 318 and the solar power inverter 320.

In an aspect, the set of transistors comprise a first transistor $S_{11}$ having its collector connected to a positive terminal of the capacitor 324 and its emitter connected to the point of common coupling 314 by a first phase transmission line 326; a second transistor $S_{12}$ having its collector connected to the first phase transmission line 326 and its emitter connected to a ground terminal 328, a third transistor $S_{21}$ having its collector connected to a positive terminal of the capacitor 324 and its emitter connected to the point of common coupling 314 by a second phase transmission line 330; a fourth transistor $S_{22}$ having its collector connected to the second phase transmission line 330 and its emitter connected to the ground terminal 328, a fifth transistor $S_{31}$ having its collector connected to a positive terminal of the capacitor 324 and its emitter connected to the point of common coupling 314 by a third phase transmission line 332, a sixth transistor $S_{32}$ having its collector connected to the third phase transmission line 332 and its emitter connected to the ground terminal 328, and a reversed biased diode 334 in parallel with each transistor of the set of transistors. A gate of each transistor of the set of transistor gates is configured to connect to a respective one of the gate control signals G.

In an aspect, the inverter controller 322 is configured to provide gate control signals G that operate the solar power inverter 320 at: greater than a unity power factor when the reactive power at the point of common coupling 314 is less than a grid reference value, unity power factor when the reactive power at the point of common coupling 314 equals the grid reference value, and less than the unity power factor when the reactive power at the point of common coupling 314 is greater than the grid reference value.

In an aspect, the inverter controller 322 comprises an adder 336 configured to receive a voltage reference signal at a positive input terminal, a point of common coupling voltage at a negative input terminal, add the voltage reference signal to the negative point of common coupling voltage and generate an error signal at an output terminal. The inverter controller 322 further comprises a proportional integral controller 338 connected in series with the adder 336. The proportional integral controller 338 is configured to sample the error signal during a time window, average the error signals and generate an average error signal. The inverter controller 322 further comprises a pulse width modulator 340 connected in series with the proportional integral controller 338. The pulse width modulator 340 is configured to receive the average error signal and generate gate control signals G. Each gate control signal G is configured to switch a polarity of the gate of a respective transistor of the solar power inverter 320 to switch the respective transistor ON or OFF.

In an aspect, the reactive power support system further comprises a voltmeter 342 connected between the point of common coupling 314 and the output terminal of the solar power inverter 320. The voltmeter 342 is configured to measure the voltage at the point of common coupling 314; and a feedback transmission line 344 connected between the voltmeter 342 and the negative input of the adder 336. The feedback transmission line 344 is configured to transmit the voltage at the point of common coupling 314 to the negative input of the adder 336.

In an aspect, the reactive power support system further comprises a grid network 346 connected to the grid transformer 308. The grid network 346 includes a grid controller 348. The grid controller 348 is configured to transmit the voltage reference signal to the positive input terminal of the adder 336.

In an aspect, the reactive power support system further comprises an electrical distribution station 102, 202 connected to the grid network 346; and an on-load tap changer 104, 204 connected between the grid network 346 and the grid transformer 308.

In another aspect, a method of providing reactive power support to a radial distribution network 300 is disclosed. The method includes connecting a first end 306 of the radial distribution transmission line 304 to a grid transformer 308. The method further includes connecting a plurality of loads 310 in parallel to the radial distribution transmission line 304. The method further includes installing a photovoltaic module 318. The method further includes connecting a solar power inverter 320 in parallel with the photovoltaic module 318. The method further includes connecting an output terminal of the solar power inverter 320 to a point of common coupling 314 at a second end 316 of the radial distribution transmission line 304. The method further includes connecting an inverter controller 322 to the solar power inverter 320. The method further includes measuring, with a voltmeter 342, a voltage at the point of common coupling 314. The method further includes receiving, by the inverter controller 322, the voltage measured at the point of common coupling 314 and a voltage reference value. The method further includes generating, by the inverter controller 322, gate control signals G configured to switch a set of transistor gates of the solar power inverter 320 to operate at less than or greater than a unity power factor to provide reactive power to or to absorb reactive power at the point of common coupling 314 respectively when the voltage measured at the point of common coupling 314 is less than or greater than the voltage reference value due to a three-phase to ground fault on a load bus 312 connected to one of the loads 310.

In an aspect, the method further includes generating, by the inverter controller 322, the gate control signals G and transmitting the gate control signals G to the set of transistor gates of the solar power inverter 320 to provide active power to the point of common coupling 314 when the voltage measured at the point of common coupling 314 is equal to the voltage reference value.

In an aspect, the method further includes connecting a capacitor 324 in parallel with the photovoltaic module 318 and the solar power inverter 320; and connecting an inductor 350 in series with the photovoltaic module 318 and the solar power inverter 320.

In an aspect, the method further includes connecting the gate control signals G to the solar power inverter 320. The solar power inverter 320 includes a first transistor $S_{11}$ having its collector connected to a positive terminal of the capacitor 324 and its emitter connected to the point of common coupling 314 by a first phase transmission line 326. The solar power inverter 320 further includes a second transistor $S_{12}$ having its collector connected to the first phase transmission line 326 and its emitter connected to a ground terminal 328. The solar power inverter 320 further includes a third transistor $S_{21}$ having its collector connected to a positive terminal of the capacitor 324 and its emitter connected to the point of common coupling 314 by a second phase transmission line 330. The solar power inverter 320 further includes a fourth transistor $S_{22}$ having its collector connected to the second phase transmission line 330 and its emitter connected to the ground terminal 328. The solar power inverter 320 further includes a fifth transistor $S_{31}$ having its collector connected to the positive terminal of the capacitor 324 and its emitter connected to the point of common coupling 314 by a third phase transmission line 332. The solar power inverter 320 further includes a sixth transistor $S_{32}$ having its collector connected to the third phase transmission line 332 and its emitter connected to the ground terminal 328. The solar power inverter 320 further includes a reversed biased diode 334 in parallel with each transistor of the set of transistors S. The method further includes connecting the gate control signals G to the set of transistor gates such that a gate of each transistor is connected to a respective gate control signal G.

In an aspect, the method further includes generating, by the inverter controller 322, the gate control signals G to operate the solar power inverter 320 at greater than a unity power factor when the reactive power at the point of common coupling 314 is less than a grid reference value, unity power factor when the reactive power at the point of common coupling 314 equals the grid reference value, and less than the unity power factor when the reactive power at the point of common coupling 314 is greater than the grid reference value.

In an aspect, the method further includes connecting a feedback transmission line 344 between the voltmeter 342 and the negative input of the adder 336; and transmitting the voltage at the point of common coupling 314 to the negative input of the adder 336.

In an aspect, the method further includes receiving, by an adder 336 of the inverter controller 322, the voltage reference at a positive input terminal and the voltage measured at the point of common coupling 314 at a negative input terminal. The method further includes subtracting the voltage measured at the point of common coupling 314 from the voltage reference signal. The method further includes generating an error signal at an output terminal of the adder 336. The method further includes sampling, by a proportional integral controller 338 connected in series with the adder 336, the error signal during a time window, averaging the error signals and generating an average error signal. The method further includes receiving, by a pulse width modulator 340 connected in series with the proportional integral controller 338, the average error signal. The method further includes generating, by the pulse width modulator 340, gate control signals G based on the average error signal. Each gate control signal is configured to switch a polarity of a gate of a respective transistor of the solar power inverter to switch of the respective transistor ON or OFF.

In an aspect, the method further includes connecting a grid network 346 to the grid transformer 308. The grid network 346 includes a grid controller 348. The method further includes transmitting, by the grid controller 348, the voltage reference value to the positive input terminal of the adder 336.

In an aspect, the method further includes connecting an electrical distribution station 102, 202 to the grid network 346; and connecting an on-load tap changer (OLTC) 104, 204 between the grid network and the grid transformer. The method further includes adjusting the transformer 308, by the on-load tap changer 104, 204, to provide a constant voltage at the first end 306 of the radial distribution transmission line 304.

In another aspect, a method of providing reactive power support by a photovoltaic module 318 to a grid connected radial distribution network 300 connected to a plurality of load buses 312 is disclosed. The method includes installing the photovoltaic module 318. The method further includes connecting a solar power inverter 320 in parallel with the photovoltaic module 318. The method further includes connecting an output terminal of the solar power inverter 320 to a point of common coupling 314 of the radial distribution transmission line 304. The method further includes connecting an inverter controller 322 to the solar power inverter 320. The method further includes measuring, with a voltmeter 342, a voltage at the point of common coupling 314. The method further includes receiving, by the inverter controller 322, the voltage measured at the point of common coupling 314 and a voltage reference value. The method further includes generating, by the inverter controller 322, gate control signals G configured to switch a set of transistor gates S of the solar power inverter 320 to operate at less than or greater than a unity power factor to provide reactive power to or to absorb reactive power at the point of common coupling 314 respectively when the voltage measured at the point of common coupling 314 is less than or greater than the voltage reference value due to a three-phase to ground fault on a load bus 312 connected to one of the loads 310.

In an aspect, the method further includes generating, by the inverter controller 322, the gate control signals G to operate the solar power inverter 320 at greater than a unity power factor when the reactive power at the point of common coupling 314 is less than a grid reference value, unity power factor when the reactive power at the point of common coupling 314 equals the grid reference value, and less than the unity power factor when the reactive power at the point of common coupling 314 is greater than the grid reference value.

Figure 7:
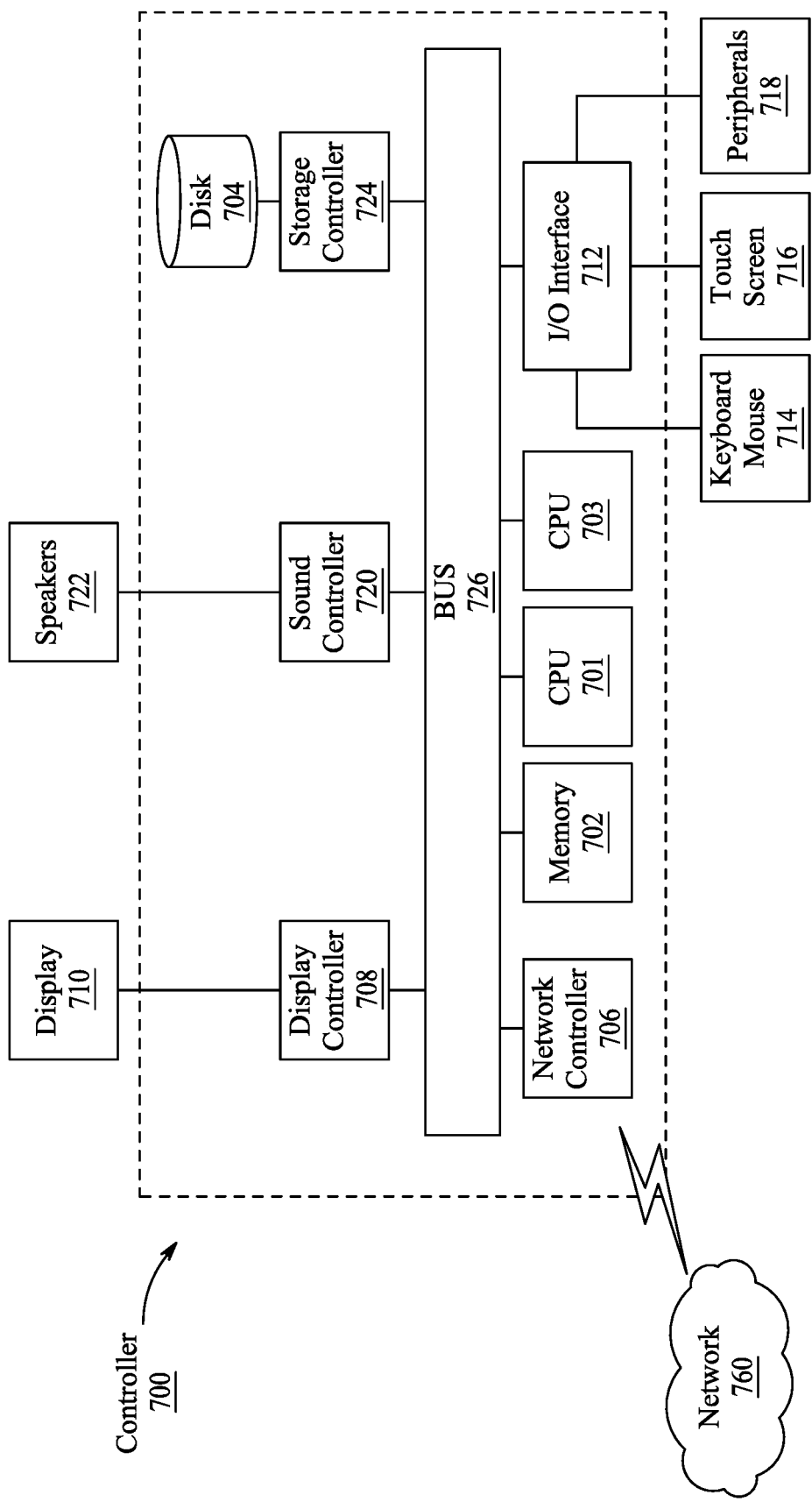
FIG. 7 illustrates details of the hardware description of the computing environment, according to exemplary embodiments.

Next, further details of the hardware description of the computing environment according to exemplary embodiments are described with reference to FIG. 7. In FIG. 7, a controller 700 described is representative of the inverter controller 322 of FIG. 3 in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The computing device further includes a display controller 708, such as a NVIDIA Geforce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general-purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
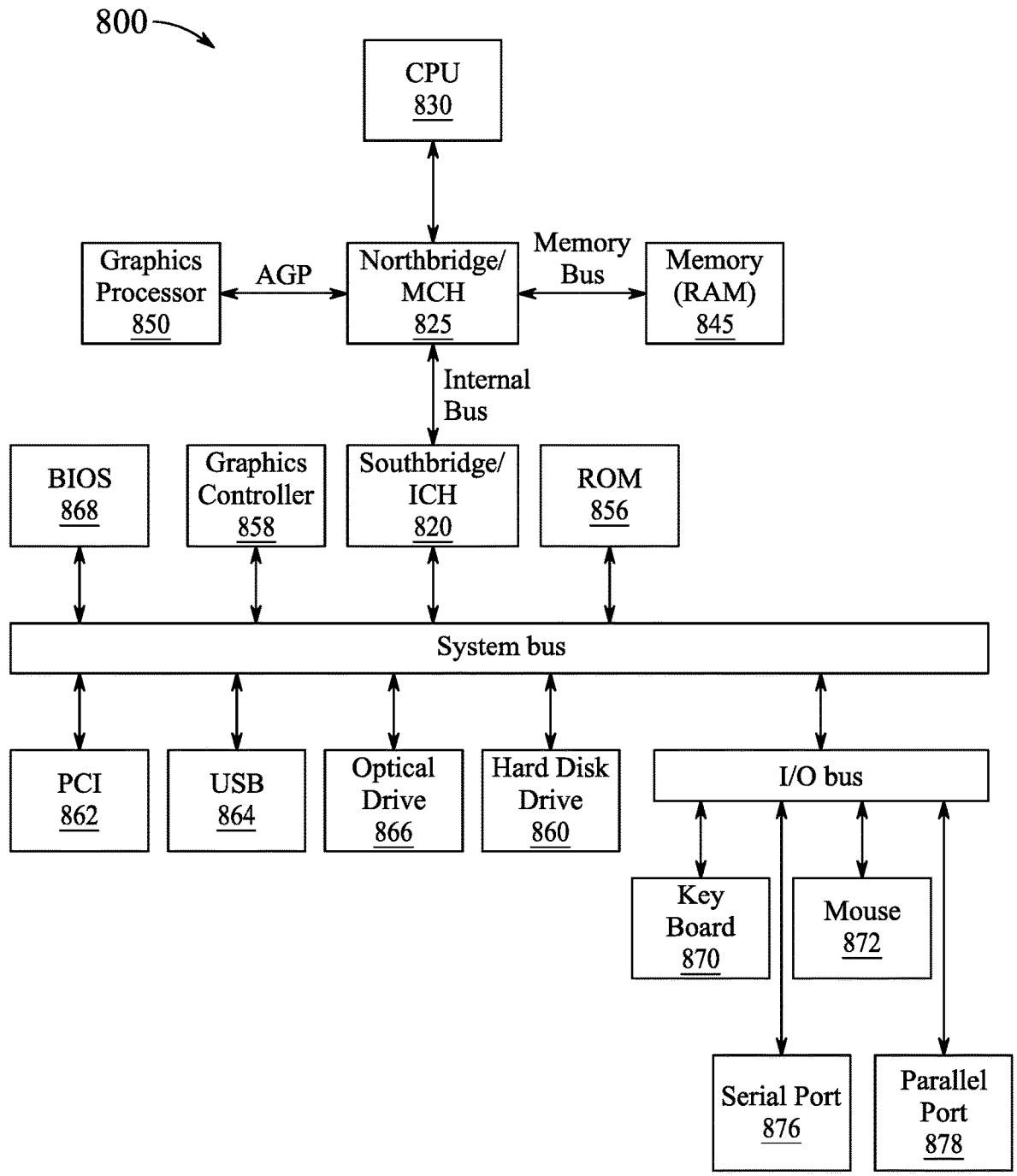
FIG. 8 illustrates a schematic diagram of a data processing system, according to certain embodiments, for performing the functions of the exemplary embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
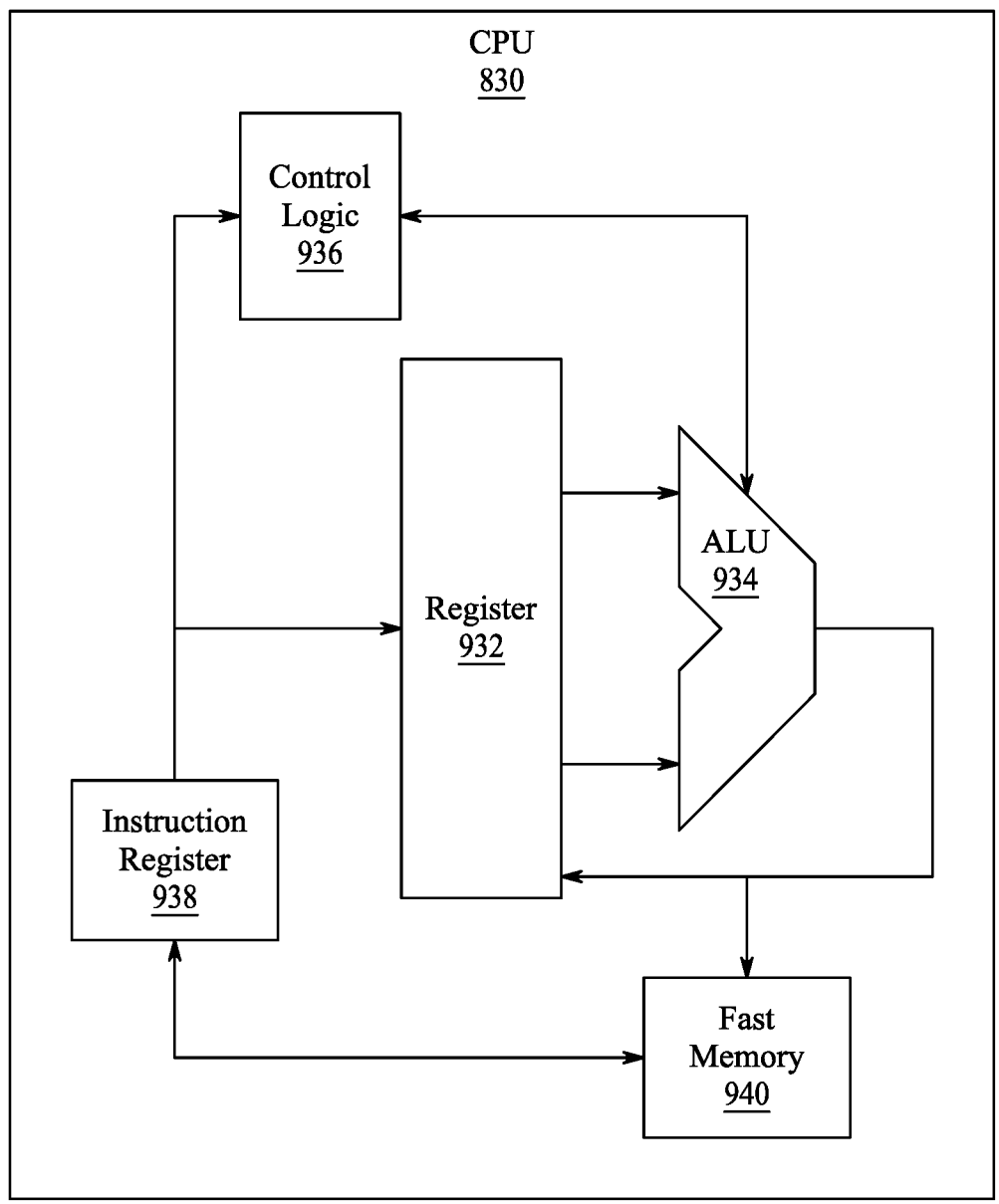
FIG. 9 shows one implementation of a CPU, according to certain embodiments.

For example, FIG. 9 shows one implementation of CPU 830, according to an embodiment. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 820 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 10:
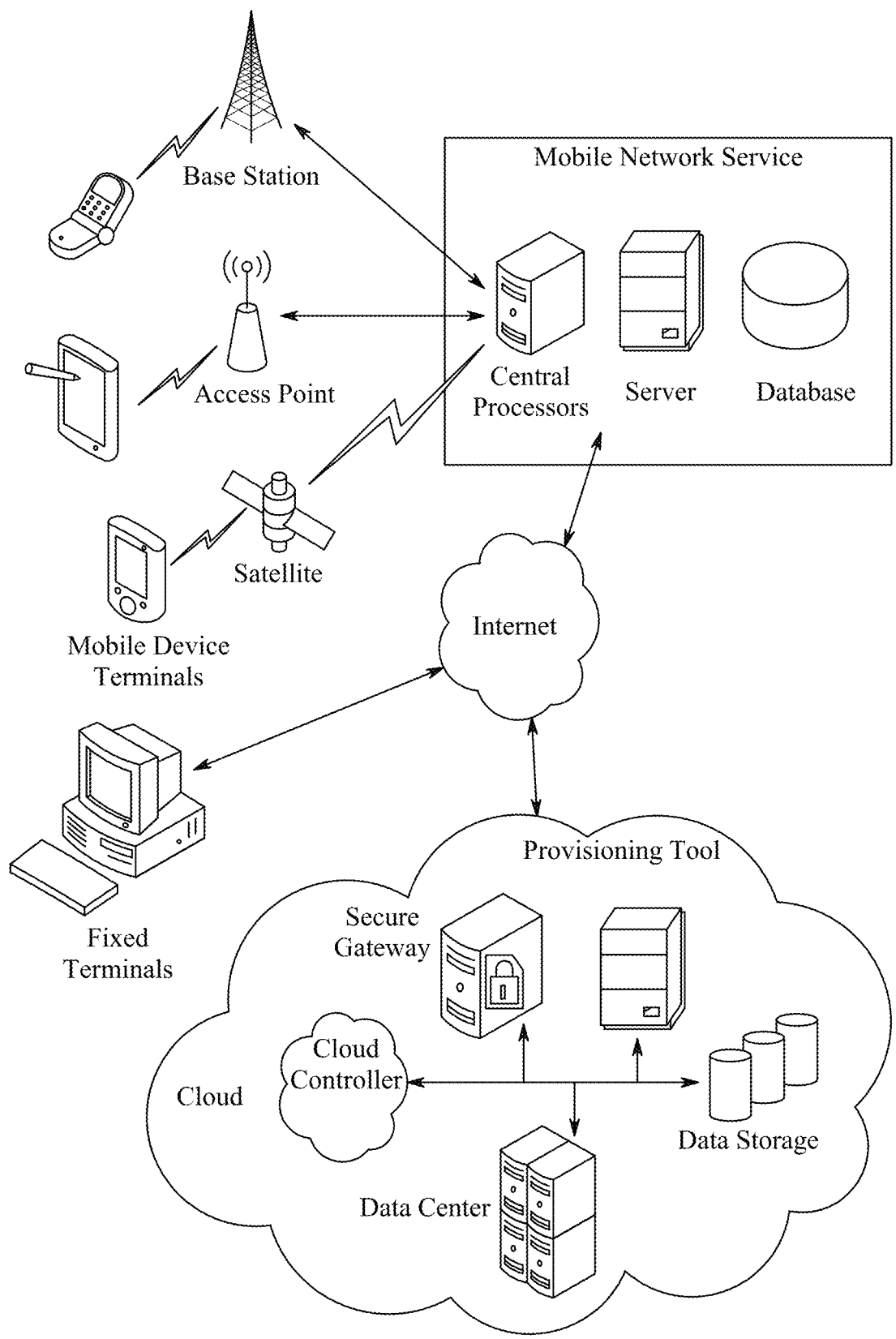
FIG. 10 illustrates various distributed components of a system for executing the functions and features as described in the disclosure, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A reactive power support system for a radial distribution network, comprising:
   a radial distribution transmission line connected at a first end to a grid transformer;
   a plurality of loads, wherein each load is connected by a load bus to the radial distribution transmission line;
   a point of common coupling connected to a second end of the radial distribution transmission line;
   a photovoltaic module;
   a solar power inverter connected in parallel with the photovoltaic module, wherein the solar power inverter has an output terminal configured to connect to the point of common coupling; and
   an inverter controller connected to the solar power inverter, wherein the inverter controller is configured to provide gate control signals which switch a set of transistor gates of the solar power inverter to operate at less than or greater than a unity power factor to provide reactive power or to absorb reactive power respectively at the point of common coupling in order to regulate a voltage of the radial distribution transmission line during a three-phase to ground fault on a load bus connected to one of the loads.

2. The reactive power support system of claim 1, wherein the gate control signals are configured to switch the set of transistor gates of the solar power inverter to provide active power to the point of common coupling when the radial distribution transmission line is balanced.

3. The reactive power support system of claim 1, further comprising:
   a capacitor in parallel with the photovoltaic module and the solar power inverter; and
   an inductor connected between the photovoltaic module and the solar power inverter.

4. The reactive power support system of claim 3, wherein the set of transistor gates comprise:
   a first transistor $S_{11}$ having its collector connected to a positive terminal of the capacitor and its emitter connected to the point of common coupling by a first phase transmission line;
   a second transistor $S_{12}$ having its collector connected to the first phase transmission line and its emitter connected to a ground terminal;
   a third transistor $S_{21}$ having its collector connected to a positive terminal of the capacitor and its emitter connected to the point of common coupling by a second phase transmission line;
   a fourth transistor $S_{22}$ having its collector connected to the second phase transmission line and its emitter connected to the ground terminal;

a fifth transistor $S_{31}$ having its collector connected to a positive terminal of the capacitor and its emitter connected to the point of common coupling by a third phase transmission line;

a sixth transistor $S_{32}$ having its collector connected to the third phase transmission line and its emitter connected to the ground terminal; and a reversed biased diode in parallel with each transistor of the set of transistors, wherein a gate of each transistor of the set of transistor gates is configured to connect to a respective one of the gate control signals.

5. The reactive power support system of claim 1, wherein the inverter controller is configured to provide gate control signals that operate the solar power inverter at:

greater than a unity power factor when the reactive power at the point of common coupling is less than a grid reference value, unity power factor when the reactive power at the point of common coupling equals the grid reference value, and less than the unity power factor when the reactive power at the point of common coupling is greater than the grid reference value.

6. The reactive power support system of claim 5, wherein the inverter controller comprises:

an adder configured to receive a voltage reference signal at a positive input terminal, a point of common coupling voltage at a negative input terminal, add the voltage reference signal to the negative point of common coupling voltage and generate an error signal at an output terminal;

a proportional integral controller connected in series with the adder, wherein the proportional integral controller is configured to sample the error signal during a time window, average the error signals and generate an average error signal; and a pulse width modulator connected in series with the proportional integral controller, wherein the pulse width modulator is configured to receive the average error signal and generate gate control signals, wherein each gate control signal is configured to switch a polarity of the gate of a respective transistor of the solar power inverter to switch the respective transistor ON or OFF.

7. The reactive power support system of claim 5, further comprising:

a voltmeter connected between the point of common coupling and the output terminal of the solar power inverter, wherein the voltmeter is configured to measure the voltage at the point of common coupling; and a feedback transmission line connected between the voltmeter and the negative input of the adder, wherein the feedback transmission line is configured to transmit the voltage at the point of common coupling to the negative input of the adder.

8. The reactive power support system of claim 5, further comprising:

a grid network connected to the grid transformer, wherein the grid network includes a grid controller, wherein the grid controller is configured to transmit the voltage reference signal to the positive input terminal of the adder.

9. The reactive power support system of claim 8, further comprising:

an electrical distribution station connected to the grid network; and an on-load tap changer (OLTC) connected between the grid network and the grid transformer.

10. A method of providing reactive power support to a radial distribution network, comprising:

connecting a first end of a radial distribution transmission line to a grid transformer;

connecting a plurality of loads in parallel to the radial distribution transmission line;

installing a photovoltaic module;

connecting a solar power inverter in parallel with the photovoltaic module;

connecting an output terminal of the solar power inverter to a point of common coupling at a second end of the radial distribution transmission line;

connecting an inverter controller to the solar power inverter;

measuring, with a voltmeter, a voltage at the point of common coupling;

receiving, by the inverter controller, the voltage measured at the point of common coupling and a voltage reference value; and generating, by the inverter controller, gate control signals configured to switch a set of transistor gates of the solar power inverter to operate at less than or greater than a unity power factor to provide reactive power to or to absorb reactive power at the point of common coupling respectively when the voltage measured at the point of common coupling is less than or greater than the voltage reference value due to a three-phase to ground fault on a load bus connected to one of the loads.

11. The method of claim 10, further comprising:

generating, by the inverter controller, the gate control signals;

transmitting the gate control signals to the set of transistor gates of the solar power inverter to provide active power to the point of common coupling when the voltage measured at the point of common coupling is equal to the voltage reference value.

12. The method of claim 10, further comprising:

connecting a capacitor in parallel with the photovoltaic module and the solar power inverter; and connecting an inductor in series with the photovoltaic module and the solar power inverter.

13. The method of claim 12, further comprising:

connecting the gate control signals to the solar power inverter, wherein the solar power inverter includes:

a first transistor $S_{11}$ having its collector connected to a positive terminal of the capacitor and its emitter connected to the point of common coupling by a first phase transmission line;

a second transistor $S_{12}$ having its collector connected to the first phase transmission line and its emitter connected to a ground terminal;

a third transistor $S_{21}$ having its collector connected to a positive terminal of the capacitor and its emitter connected to the point of common coupling by a second phase transmission line;

a fourth transistor $S_{22}$ having its collector connected to the second phase transmission line and its emitter connected to the ground terminal;

a fifth transistor $S_{31}$ having its collector connected to a positive terminal of the capacitor and its emitter connected to the point of common coupling by a third phase transmission line;

a sixth transistor $S_{32}$ having its collector connected to the third phase transmission line and its emitter connected to the ground terminal;

a reversed biased diode in parallel with each transistor of the set of transistors; and connecting the gate control signals to the set of transistor gates such that a gate of each transistor is connected to a respective gate control signal.

14. The method of claim 13, further comprising:
generating, by the inverter controller, the gate control signals to operate the solar power inverter at:
greater than a unity power factor when the reactive power at the point of common coupling is less than a grid reference value,
unity power factor when the reactive power at the point of common coupling equals the grid reference value, and
less than the unity power factor when the reactive power at the point of common coupling is greater than the grid reference value.

15. The method of claim 14, further comprising:
connecting a feedback transmission line between the voltmeter and the negative input of the adder; and
transmitting the voltage at the point of common coupling to the negative input of the adder.

16. The method of claim 15, further comprising:
receiving, by an adder of the inverter controller, the voltage reference at a positive input terminal and the voltage measured at the point of common coupling at a negative input terminal;
subtracting the voltage measured at the point of common coupling from the voltage reference signal;
generating an error signal at an output terminal of the adder;
sampling, by a proportional integral controller connected in series with the adder, the error signal during a time window, averaging the error signals and generating an average error signal; and
receiving, by a pulse width modulator connected in series with the proportional integral controller, the average error signal;
generating, by the pulse width modulator, gate control signals based on the average error signal, wherein each gate control signal is configured to switch a polarity of a gate of a respective transistor of the solar power inverter to switch of the respective transistor ON or OFF.

17. The method of claim 16, further comprising:
connecting a grid network to the grid transformer, wherein the grid network includes a grid controller; and transmitting, by the grid controller, the voltage reference value to the positive input terminal of the adder.

18. The method of claim 17, further comprising:
connecting an electrical distribution station to the grid network; and
connecting an on-load tap changer (OLTC) between the grid network and the grid transformer; and
adjusting the transformer, by the OLTC, to provide a constant voltage at the first end of the radial distribution transmission line.

19. A method of providing reactive power support by a photovoltaic module to a grid connected radial distribution network connected to a plurality of load buses, comprising:
installing a photovoltaic module;
connecting a solar power inverter in parallel with the photovoltaic module;
connecting an output terminal of the solar power inverter to a point of common coupling of a radial distribution transmission line;
connecting an inverter controller to the solar power inverter;
measuring, with a voltmeter, a voltage at the point of common coupling;
receiving, by the inverter controller, the voltage measured at the point of common coupling and a voltage reference value; and
generating, by the inverter controller, gate control signals configured to switch a set of transistor gates of the solar power inverter to operate at less than or greater than a unity power factor to provide reactive power to or to absorb reactive power at the point of common coupling respectively when the voltage measured at the point of common coupling is less than or greater than the voltage reference value due to a three-phase to ground fault on a load bus connected to one of the loads.

20. The method of claim 19, further comprising:
generating, by the inverter controller, the gate control signals to operate the solar power inverter at:
greater than a unity power factor when the reactive power at the point of common coupling is less than a grid reference value,
unity power factor when the reactive power at the point of common coupling equals the grid reference value, and
less than the unity power factor when the reactive power at the point of common coupling is greater than the grid reference value.

\* \* \* \* \*